United States Patent
Kintali et al.

(10) Patent No.: US 9,292,419 B1
(45) Date of Patent: Mar. 22, 2016

(54) CODE COVERAGE AND CONFIDENCE DETERMINATION

(71) Applicant: The MathWorks, Inc., Natick, MA (US)

(72) Inventors: Kiran K. Kintali, Ashland, MA (US); Anand Krishnamoorthi, Somerville, MA (US); Ebrahim Mestchian, Newton, MA (US); Richard M. McKeever, Springfield, MA (US)

(73) Assignee: The MathWorks, Inc., Natick, MA (US)

( * ) Notice: Subject to any disclaimer, the term of this patent is extended or adjusted under 35 U.S.C. 154(b) by 6 days.

(21) Appl. No.: 14/290,042

(22) Filed: May 29, 2014

Related U.S. Application Data

(60) Provisional application No. 61/830,807, filed on Jun. 4, 2013.

(51) Int. Cl.
*G06F 9/44* (2006.01)
*G06F 11/36* (2006.01)

(52) U.S. Cl.
CPC ........ *G06F 11/3676* (2013.01); *G06F 11/3608* (2013.01)

(58) Field of Classification Search
None
See application file for complete search history.

(56) References Cited

U.S. PATENT DOCUMENTS

| | | | | |
|---|---|---|---|---|
| 6,029,004 A * | 2/2000 | Bortnikov | ............... | G06F 8/445 712/214 |
| 6,192,511 B1 * | 2/2001 | Johnston et al. | ............... | 717/109 |
| 6,360,360 B1 * | 3/2002 | Bates | ............... | G06F 8/443 717/130 |
| 6,959,431 B1 * | 10/2005 | Shiels et al. | ............... | 717/124 |
| 8,260,602 B1 * | 9/2012 | Hamon | ............... | 703/22 |
| 8,490,057 B2 * | 7/2013 | Pistoia | ............... | G06F 11/3603 717/124 |
| 9,141,350 B2 * | 9/2015 | Stravers | ............... | G06F 8/35 |
| 2003/0236951 A1 * | 12/2003 | Choi | ............... | G06F 11/3632 711/150 |
| 2005/0193184 A1 * | 9/2005 | Kohno | ............... | G06F 17/5045 712/1 |
| 2006/0150160 A1 * | 7/2006 | Taft | ............... | G06F 11/3604 717/126 |
| 2008/0114937 A1 * | 5/2008 | Reid et al. | ............... | 711/117 |
| 2008/0235674 A1 * | 9/2008 | Gao | ............... | G06F 8/4441 717/141 |
| 2009/0019428 A1 * | 1/2009 | Li et al. | ............... | 717/128 |
| 2009/0044177 A1 * | 2/2009 | Bates | ............... | G06F 8/75 717/131 |
| 2009/0144698 A1 * | 6/2009 | Fanning et al. | ............... | 717/120 |
| 2011/0271253 A1 * | 11/2011 | Bnayahu et al. | ............... | 717/123 |
| 2011/0289488 A1 * | 11/2011 | Ghosh | ............... | 717/131 |
| 2012/0030657 A1 * | 2/2012 | Gao et al. | ............... | 717/128 |
| 2012/0179935 A1 * | 7/2012 | Wang et al. | ............... | 714/32 |
| 2012/0204154 A1 * | 8/2012 | Li et al. | ............... | 717/124 |
| 2012/0226942 A1 * | 9/2012 | Gangasani et al. | ............... | 714/30 |
| 2012/0233596 A1 * | 9/2012 | Adler et al. | ............... | 717/124 |
| 2012/0233614 A1 * | 9/2012 | Adler et al. | ............... | 718/100 |
| 2013/0074059 A1 * | 3/2013 | Emani | ............... | G06F 8/452 717/158 |
| 2013/0085720 A1 * | 4/2013 | Xie et al. | ............... | 703/1 |
| 2013/0332906 A1 * | 12/2013 | Razavi et al. | ............... | 717/124 |
| 2014/0059081 A1 * | 2/2014 | Farchi et al. | ............... | 707/792 |
| 2014/0096113 A1 * | 4/2014 | Kuehlmann et al. | ............... | 717/126 |

\* cited by examiner

*Primary Examiner* — Matthew Brophy
(74) *Attorney, Agent, or Firm* — Harrity & Harrity, LLP

(57) ABSTRACT

A device receives code for a technical computing environment, and receives conditions for executing the code. The device performs a static analysis of the code, based on the conditions, to generate static analysis information for the code, and executes the code in the technical computing environment based on the conditions. The device determines coverage information associated with the executing code, where the coverage information provides a measure of completeness associated with the executing code. The device compares the static analysis information and the coverage information to determine confidence information associated with the coverage information, and outputs or stores the coverage information and the confidence information.

22 Claims, 19 Drawing Sheets

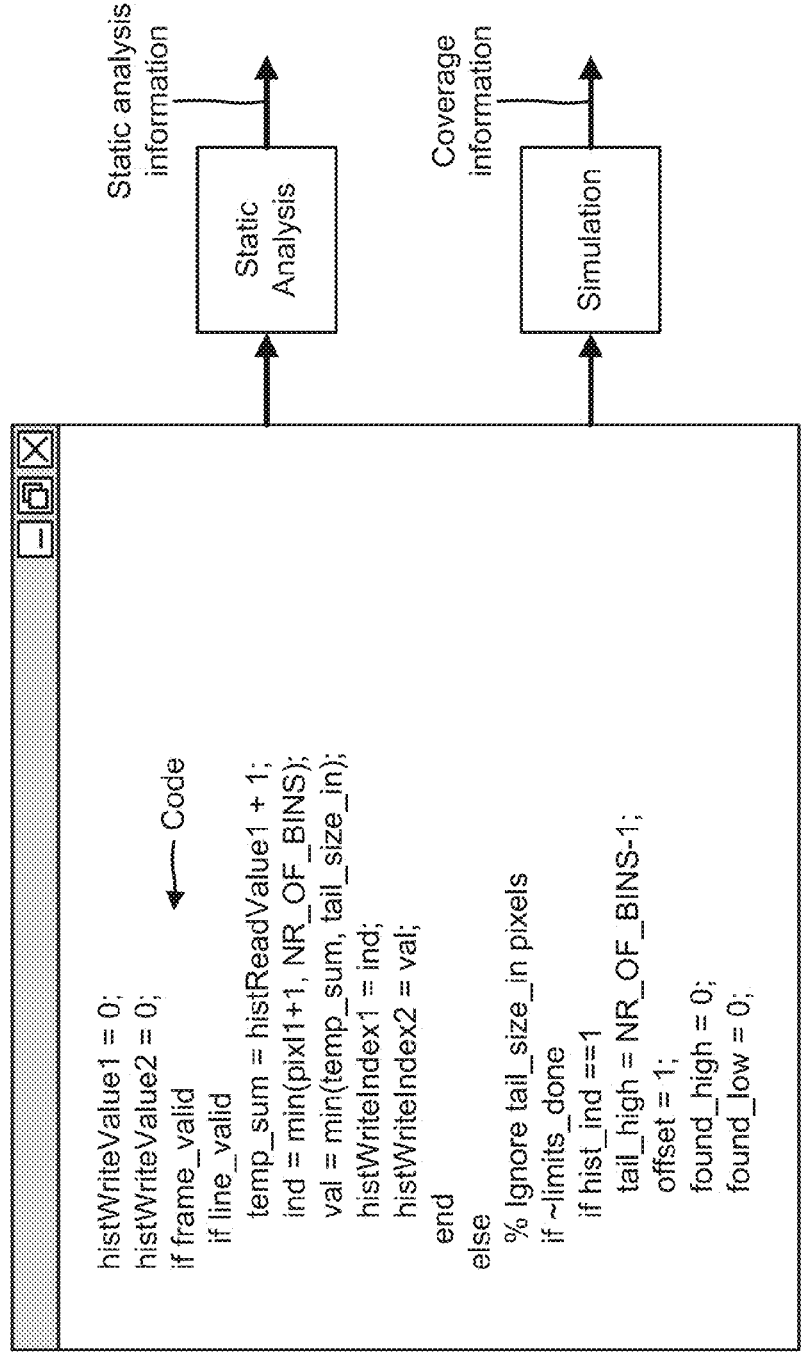

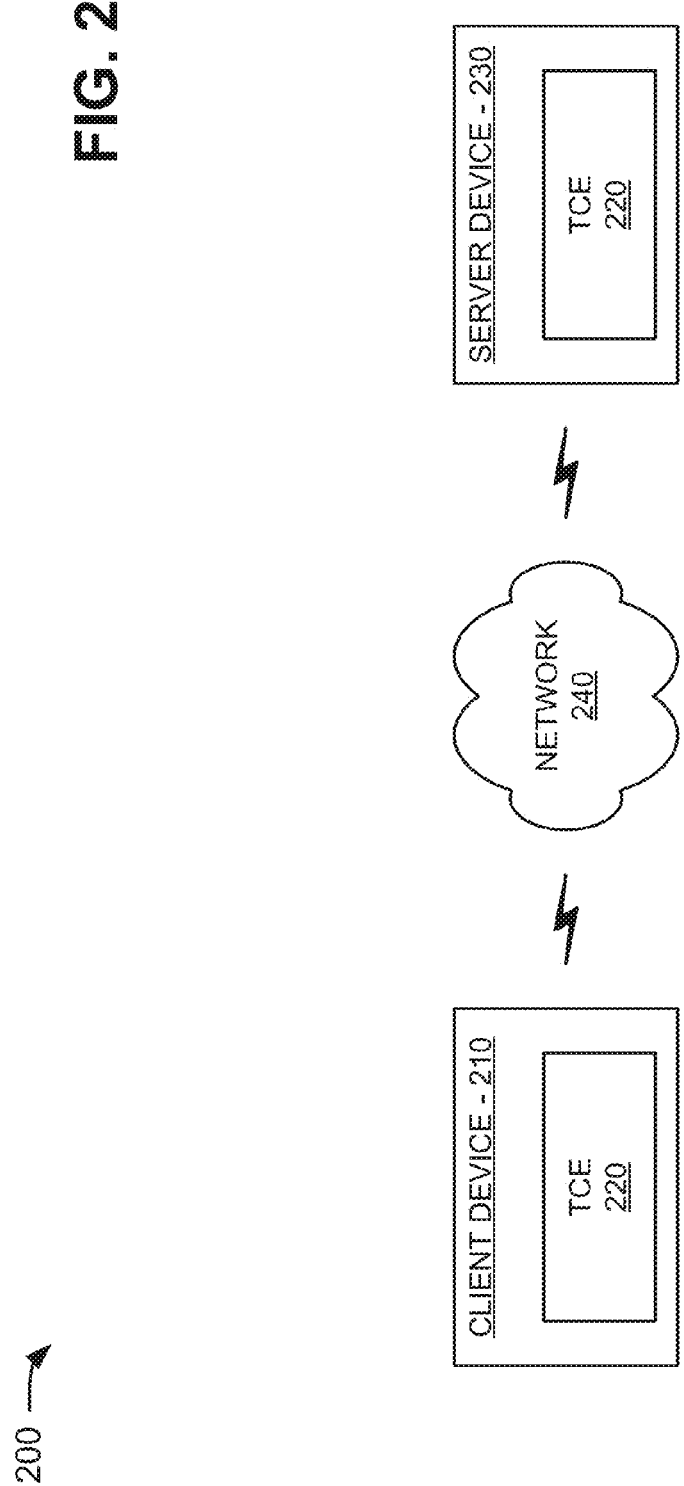

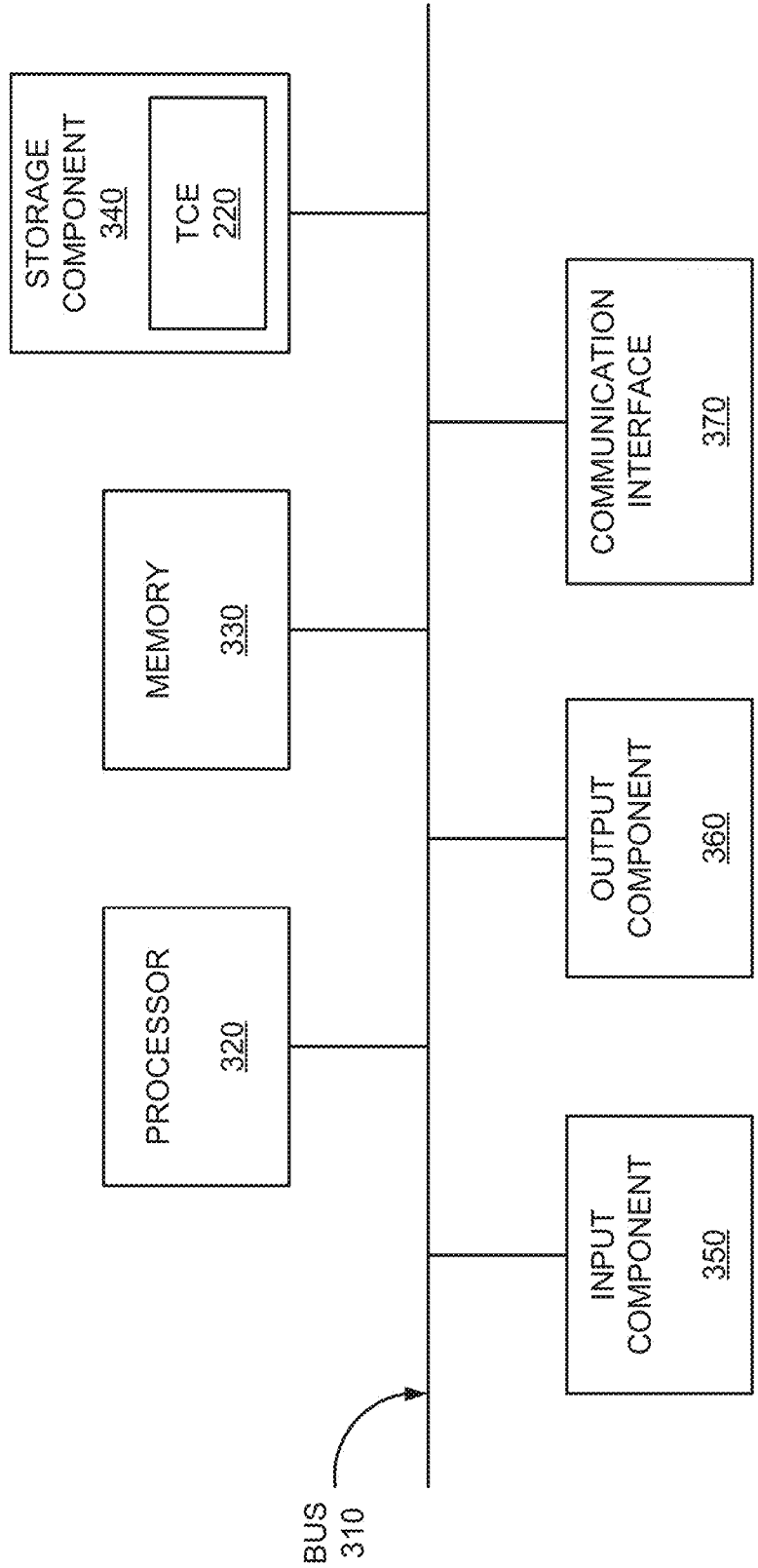

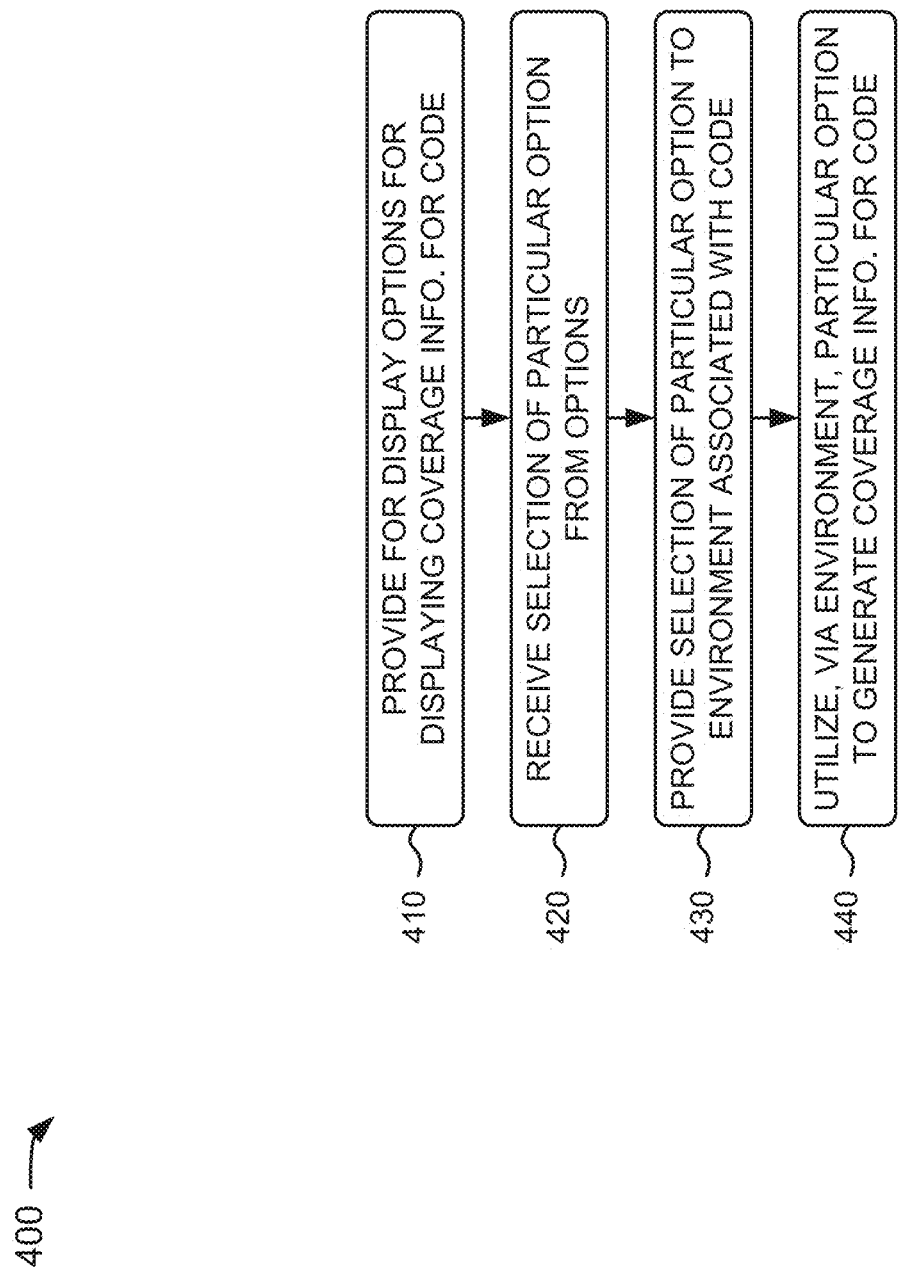

FIG. 5A

```
histWriteValue
histWriteValue
if frame_valid
  if line_valid
    temp_sum
    ind = min(
    val = min(temp_sum, tail_size_in);
    histWriteIndex1 = ind;
    histWriteIndex2 = val;
  end
else
  % Ignore tail_size_in pixels
  if ~limits_done
    if hist_ind ==1
      tail_high = NR_OF_BINS-1;
      offset = 1;
```

TEST FILES TO RUN
mlhdlc_dti_tb.m
Add test file...
OPTIONS
Log data
Show code coverage ←— Option (530)
←— Code (520)

Run Simulation

510

500

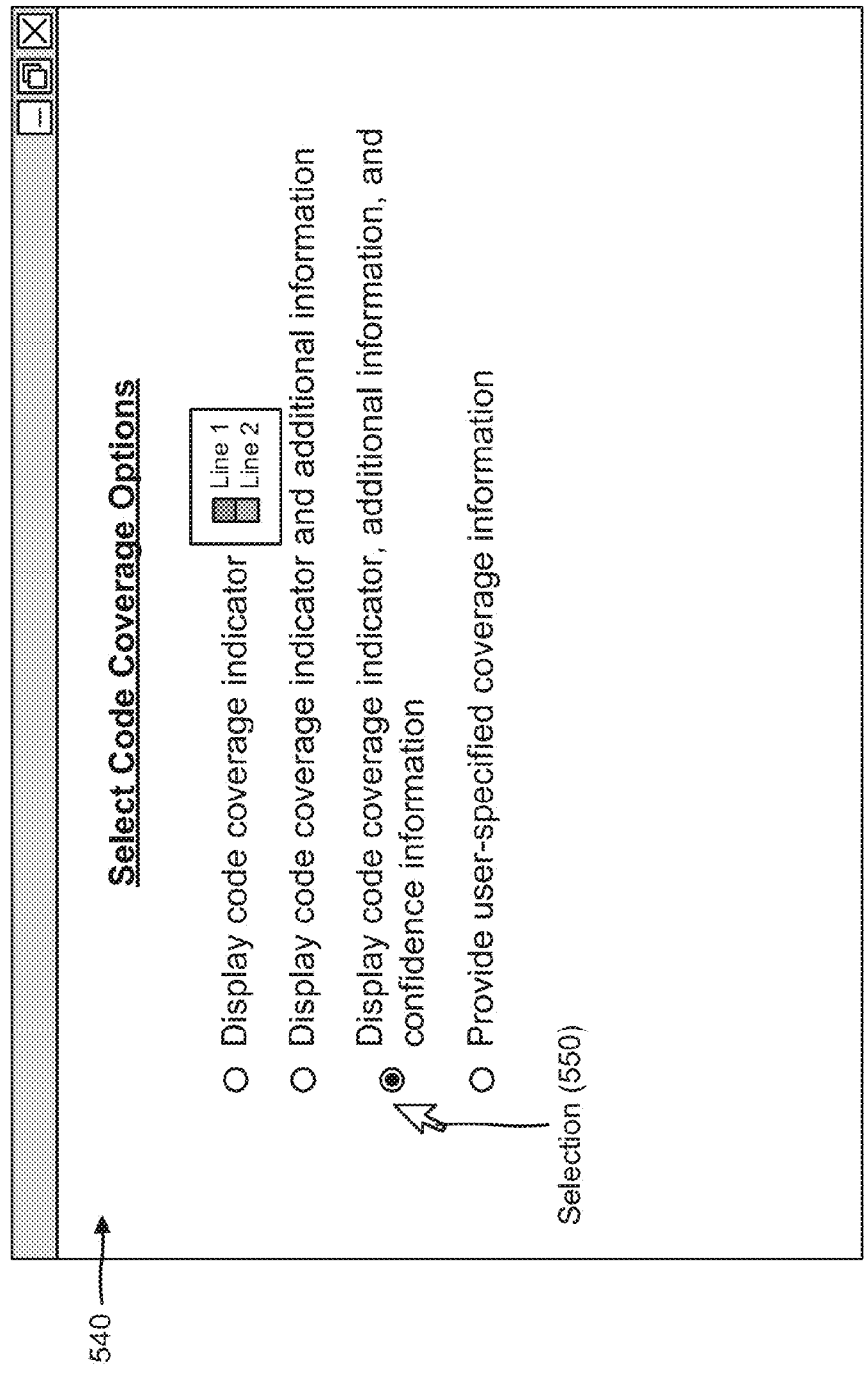

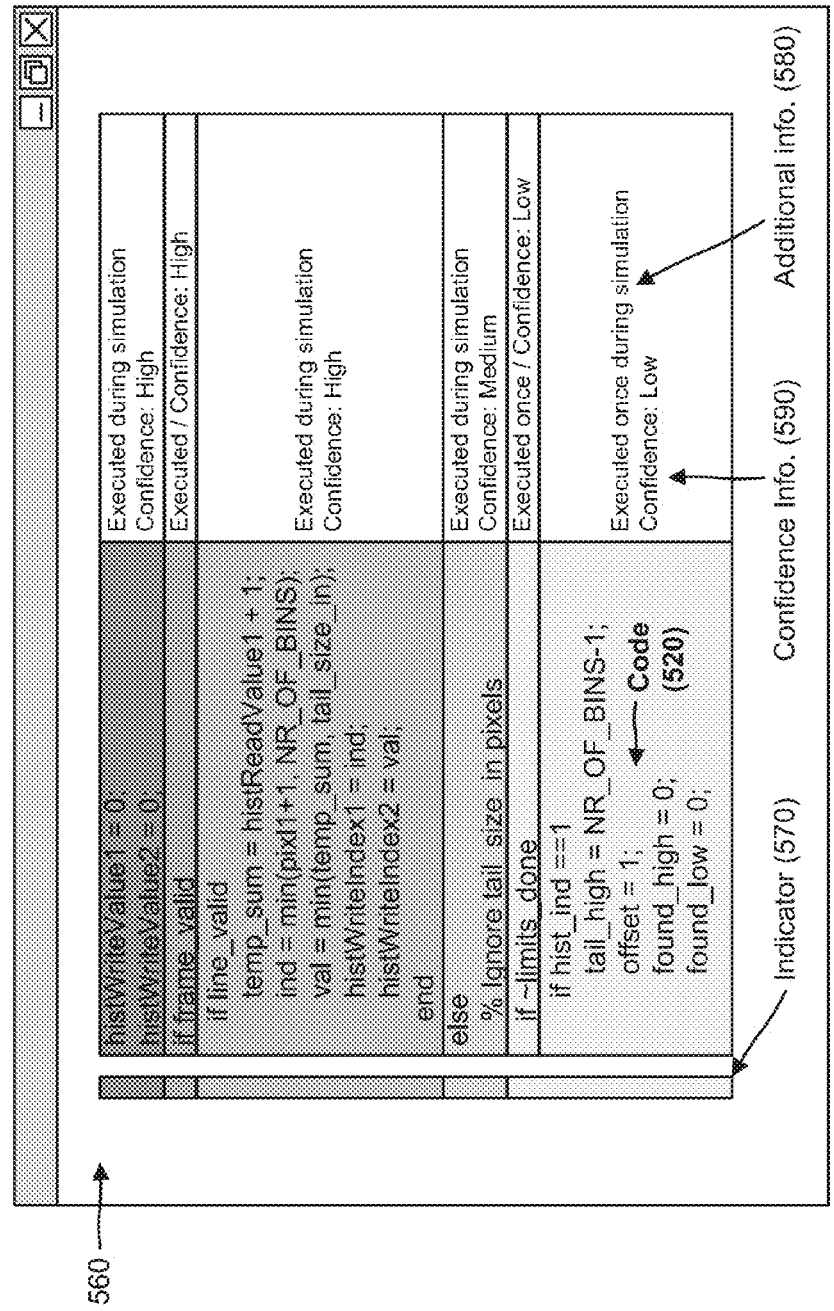

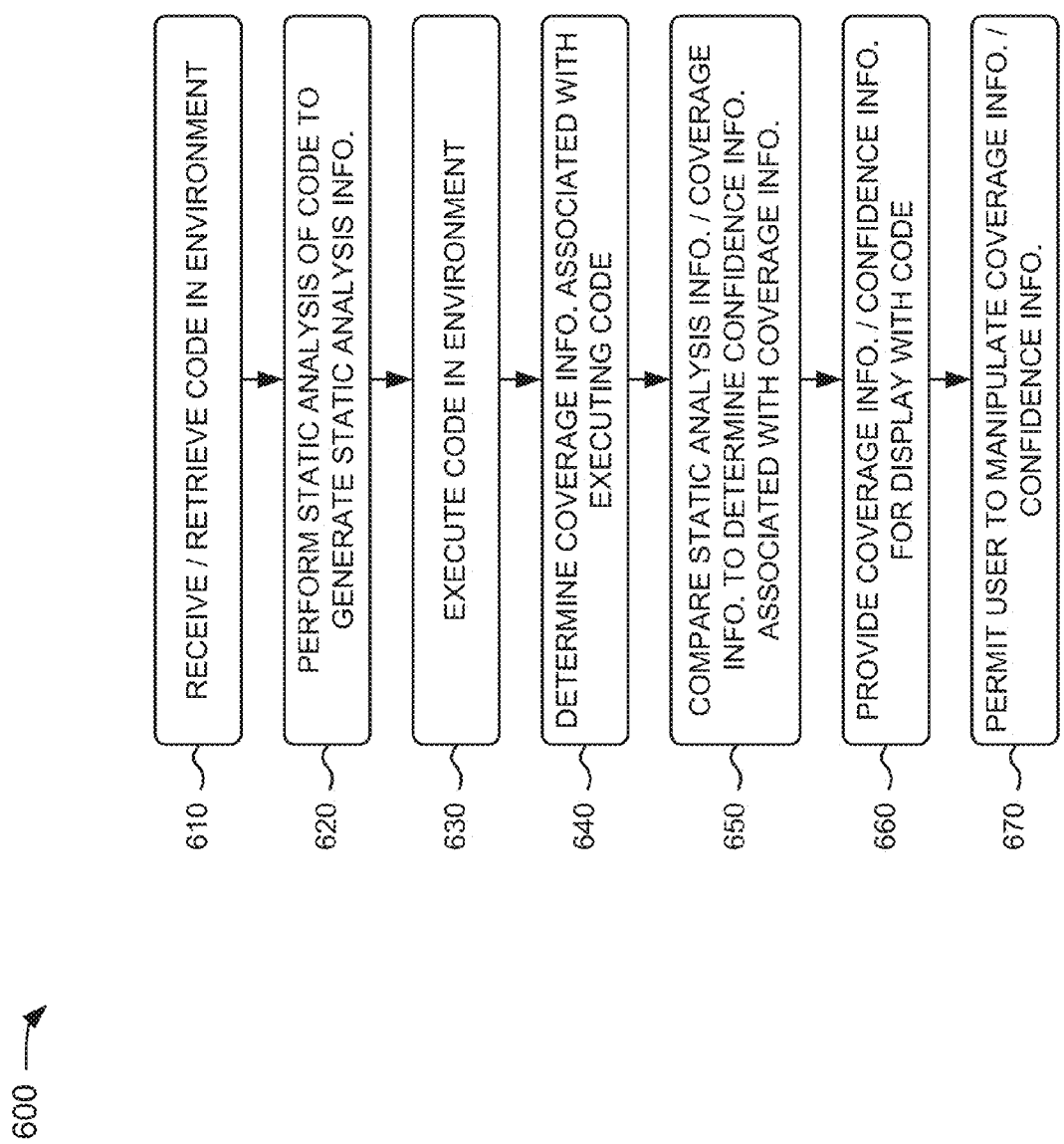

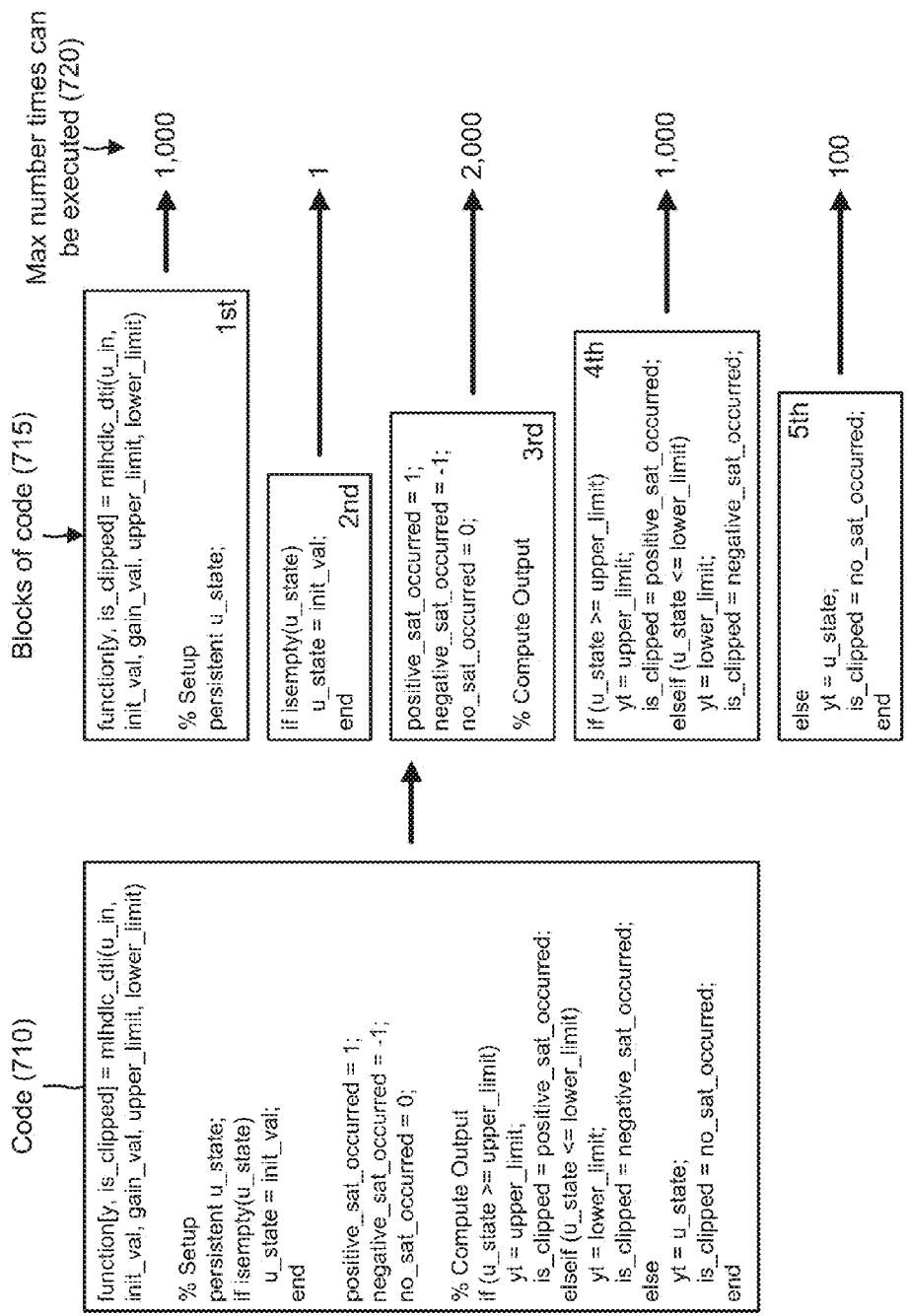

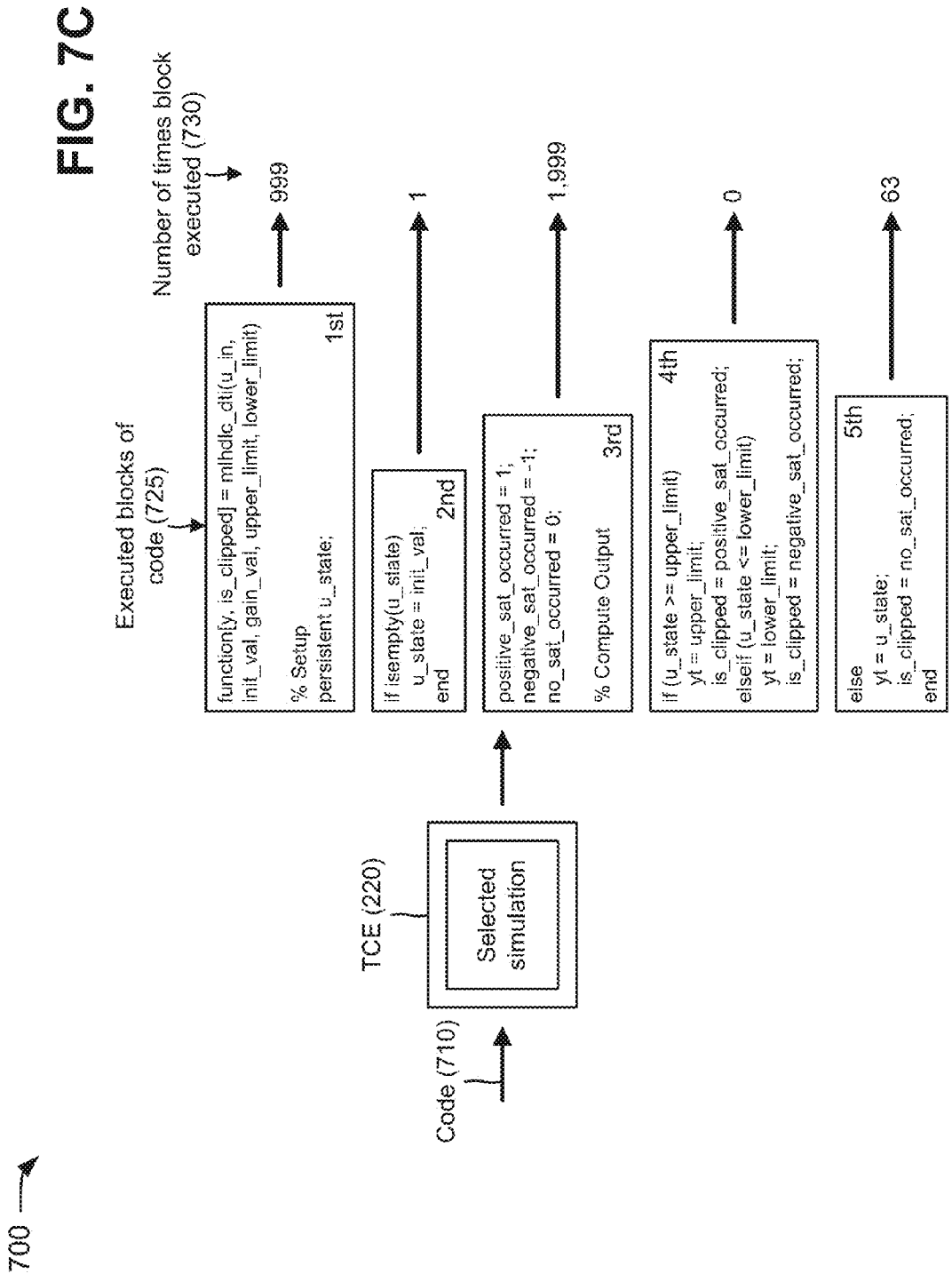

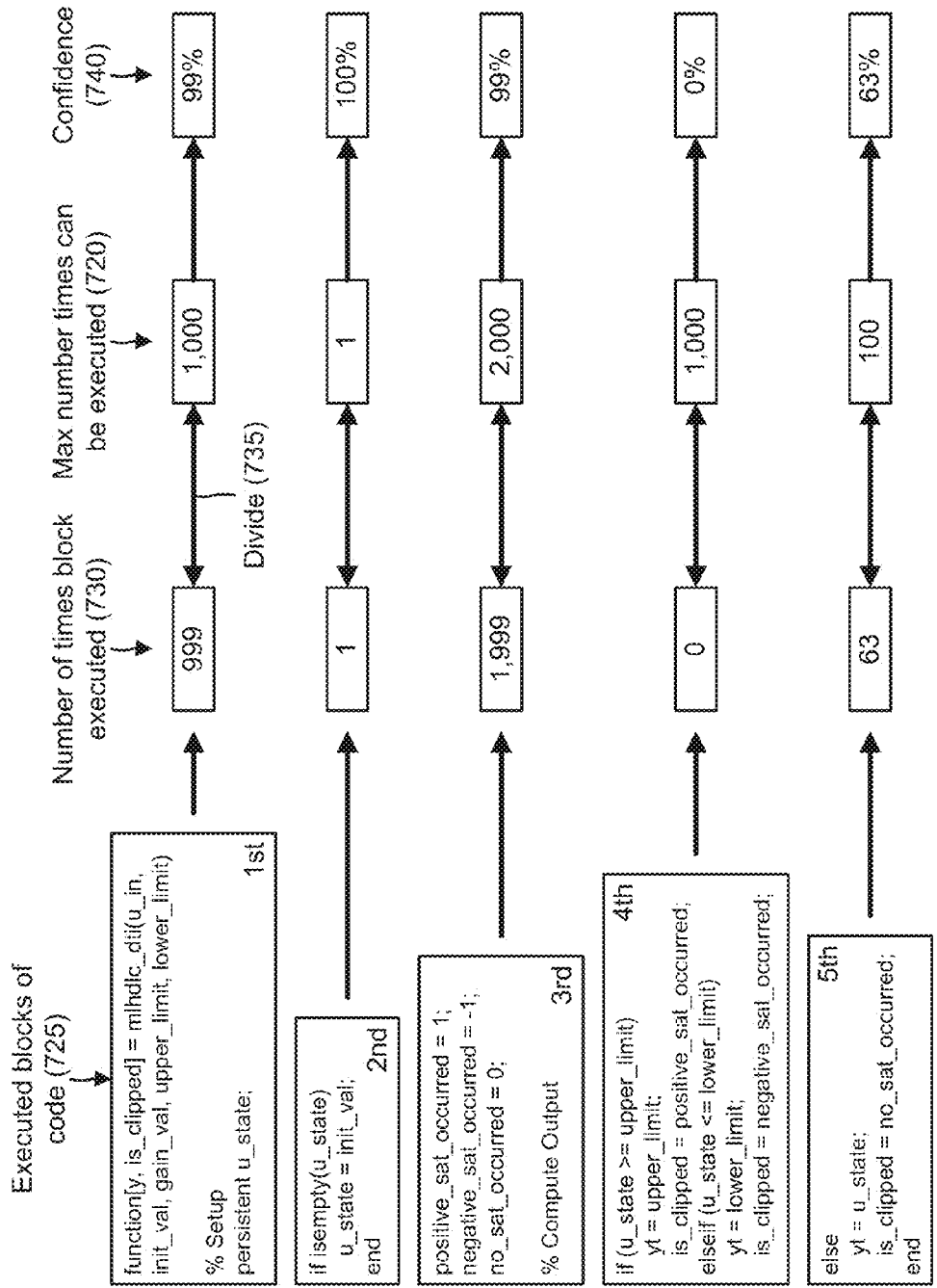

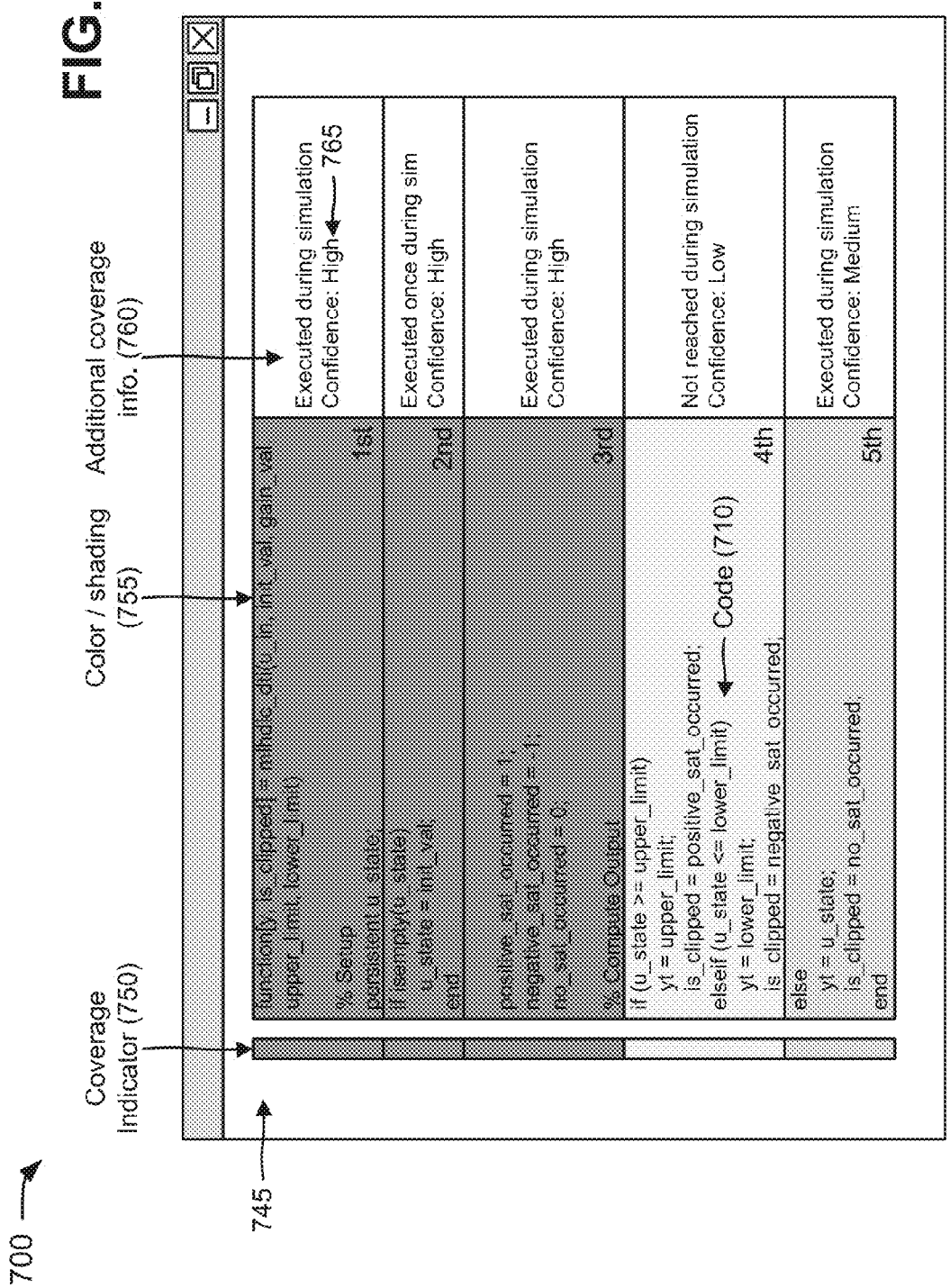

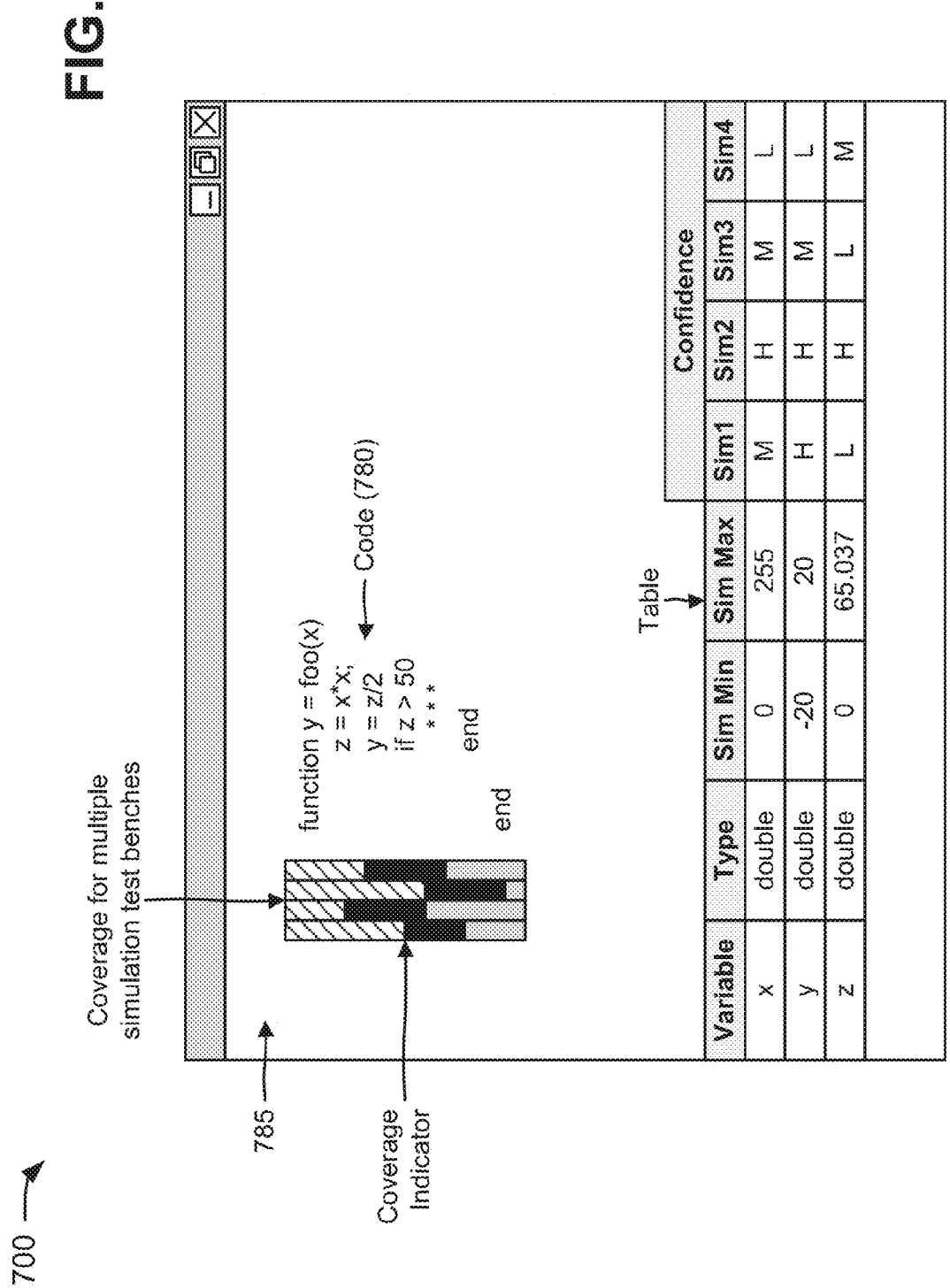

CODE COVERAGE AND CONFIDENCE DETERMINATION

RELATED APPLICATION

This application claims priority under 35 U.S.C. §119 based on U.S. Provisional Patent Application No. 61/830,807, filed Jun. 4, 2013, the disclosure of which is incorporated by reference herein in its entirety.

BRIEF DESCRIPTION OF THE DRAWINGS

FIGS. 1A and 1B are diagrams of an overview of an example implementation described herein;

FIG. 2 is a diagram of an example environment in which systems and/or methods described herein may be implemented;

FIG. 3 is a diagram of example components of one or more devices of FIG. 2;

FIG. 4 is a flow chart of an example process for selecting an option for displaying coverage information and confidence information associated with code;

FIGS. 5A-5D are diagrams of an example relating to the example process shown in FIG. 4;

FIG. 6 is a flow chart of an example process for determining coverage information and confidence information associated with code; and FIGS. 7A-7I are diagrams of an example relating to the example process shown in FIG. 6.

DETAILED DESCRIPTION

The following detailed description of example implementations refers to the accompanying drawings. The same reference numbers in different drawings may identify the same or similar elements.

A technical computing environment (TCE) may include a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. The TCE may use an array, a vector, and/or a matrix as basic elements. A user may utilize the TCE to generate code and/or a model, such as a textual model, a graphical model, or a combination of a textual model and a graphical model.

The user may wish to test or execute the code (or model) created with the TCE. Coverage analysis is used to dynamically analyze a way that code and/or a model execute, and may provide a measure (e.g. code coverage and/or model coverage) of completeness of testing based on the code structure. A simple form of coverage analysis may include statement coverage. Full statement coverage may indicate that every statement in the code has executed at least once. However, statement coverage does not completely analyze control flow constructs within the code. A more rigorous form of coverage may include decision coverage. Full decision coverage may indicate that each control flow point in the code has taken every possible outcome at least once. However, decision coverage ignores complications that result when a decision is determined by a logical expression containing logical operators (e.g., AND, OR, etc.) or due to combinations of outcomes of different decision points. Modified condition/decision coverage (MC/DC) may require the following to be true at least once: each decision tries every possible outcome; each condition in a decision takes on every possible outcome; each entry and exit point is invoked; and each condition in a decision is shown to independently affect the outcome of the decision. The TCE may allow the user to test and execute code and/or a model. The TCE may build internal data structures from the code and/or the model, and may annotate the data structures with constructs for computing coverage-information. The TCE may directly interpret the data structures in order to execute the code and/or the model, or may generate instructions in another language (e.g., code-generation) to execute the code and/model.

Figure 1B:
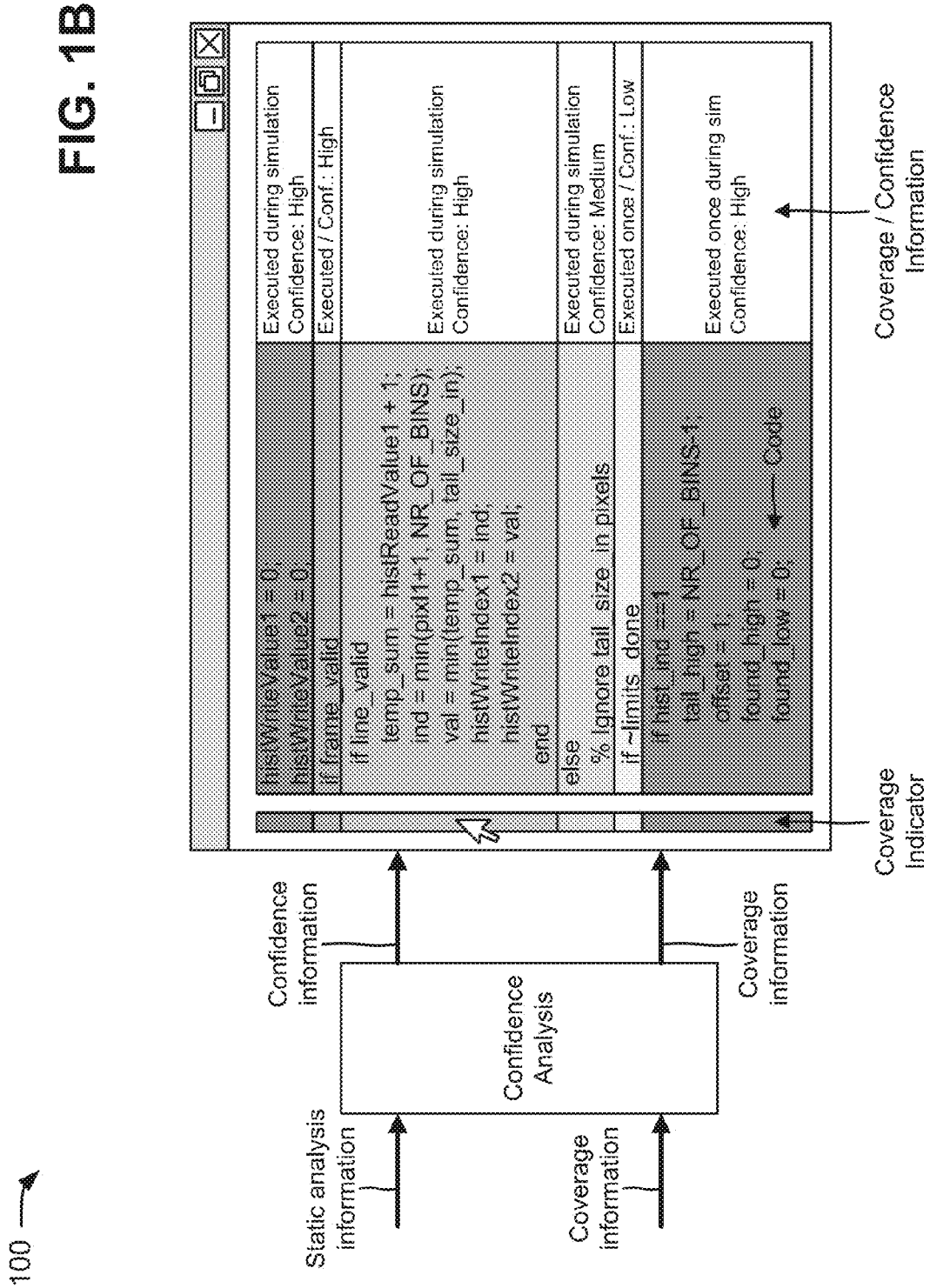

FIGS. 1A and 1B are diagrams of an overview of an example implementation 100 described herein. As shown in FIG. 1A, a user may utilize a TCE, provided on a computing device, to generate code. Assume that the user wishes to test or execute the code via a simulation. Further, assume that the user creates a simulation test bench that provides conditions (e.g., input data, output data, etc.) for executing the code, and instructs the TCE to execute the code based on the conditions. The TCE may execute the code based on the conditions. For example, as shown in FIG. 1A, the TCE may perform a static analysis of the code (e.g., without executing the code) to generate static analysis information. The static analysis may include dividing the code into portions or blocks of code, and determining a maximum number of times each code block may be executed (e.g., the static analysis information).

As further shown in FIG. 1A, the TCE may execute the code based on the conditions, and may determine coverage information based on the executing code. In some implementations, the TCE may execute the code blocks, and may determine the coverage information based on the execution of the code blocks. For example, the TCE may determine an actual number of times each code block is executed (e.g., the coverage information).

As shown in FIG. 1B, the TCE may perform a confidence analysis based on the static analysis information and the coverage information. The confidence analysis may include comparing the static analysis information and the coverage information to determine confidence information associated with the coverage information. For example, the TCE may divide the actual number of times each code block is executed (e.g., the coverage information) by the maximum number of times each code block may be executed (e.g., the static information) to determine a confidence measure for each code block.

As further shown in FIG. 1B, the TCE may cause the computing device to display the coverage information and the confidence information with the code. For example, the coverage information may be displayed as a coverage indicator adjacent to the code. The coverage indicator may include different colors, shadings, patterns, etc. that provide an indication of the coverage associated with the code blocks. The user may hover over or select the coverage indicator to provide additional coverage information and/or confidence information associated with one or more of the code blocks. For example, as shown in FIG. 1B, the TCE may cause the computing device to display additional coverage information (e.g., "Executed during simulation") and confidence information (e.g., "Confidence: High") associated with a first code block (e.g., hist WriteValue1=0; and histWriteValue2=0;); additional coverage information (e.g., "Executed during simulation") and confidence information (e.g., "Confidence: High") associated with a second code block (e.g., if frame_valid); etc. In some implementations, the TCE may determine a high confidence in a code block with low code coverage. For example, if the last code block (e.g., if hist_ind==1, etc.) is only to be reached or executed once based on a design of the code, the coverage information may indicate that the last code block is executed once (e.g., "Executed once during simulation"). However, since the last code block is only to be reached once, the TCE may determine confidence information (e.g., "Confidence: High") for the last code block.

Systems and/or methods described herein may enable a user to test code via a simulation, and to determine coverage and confidence information for the code based on the simulation. The systems and/or methods may display the coverage and confidence information in a manner that enables the user to determine whether portions of the code are fully or partially covered, and to identify false positives in the code (e.g., when a code portion can only be executed once but the coverage information indicates that the code portion is inadequately covered). The systems and/or methods may provide feedback about the quality of the simulation test bench (e.g., whether to add more test benches or perform static analysis, etc.).

The systems and/or methods are described in connection with determining and displaying coverage information and confidence information associated with code. However, the systems and/or methods may also be utilized to determine and display coverage information and confidence information associated with a model, such as a textual model, a graphical model, or a combination of a textual model and a graphical model.

The systems and/or methods are described in connection with determining and displaying coverage information associated with execution of code (e.g., execution coverage). However, the systems and/or methods may also be utilized to determine and display minimum/maximum range coverage associated with the code, overflow information associated with the code, profiling information associated with the code, and/or memory consumption associated with the code.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, executing, and/or providing information in a manner described herein. For example, client device 210 may include a computing device, such as a desktop computer, a laptop computer, a tablet computer, a handheld computer, a server, a mobile phone (e.g., a smart phone, a radiotelephone, etc.), or a similar device. In some implementations, client device 210 may receive information from and/or transmit information to server device 230.

TCE 220 may be provided within a computer-readable medium of client device 210. Alternatively, or additionally, TCE 220 may be provided in another device (e.g., server device 230) that is accessible by client device 210. TCE 220 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In some implementations, TCE 220 may include a dynamically-typed programming language (e.g., the M language, a MATLAB® language, a MATLAB-compatible language, a MATLAB-like language, etc.) that can be used to express problems and/or solutions in mathematical notations.

For example, TCE 220 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 220 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc. In some implementations, TCE 220 may provide high level programming with a dynamically-typed language or an array-based language that may be a form of modeling.

TCE 220 may further provide mathematical functions and/or graphical tools (e.g., for creating plots, surfaces, images, volumetric representations, etc.). In some implementations, TCE 220 may provide these functions and/or tools using toolboxes (e.g., toolboxes for signal processing, image processing, data plotting, parallel processing, etc.). In some implementations, TCE 220 may provide these functions as block sets or in another way, such as via a library, etc.

TCE 220 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 220 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in TCE 220. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically typed array-based computing language, data may be represented by arrays and data types of data may be determined at run-time.

In some implementations, TCE 220 may provide mathematical routines and a high-level programming language suitable for non-professional programmers and may provide graphical tools that may be used for creating plots, surfaces, images, volumetric representations, or other representations. TCE 220 may provide these routines and/or tools using toolboxes (e.g., toolboxes for signal processing, image processing, data plotting, parallel processing, etc.). TCE 220 may also provide these routines in other ways, such as, for example, via a library, a local or remote database (e.g., a database operating in a computing cloud), remote procedure calls (RPCs), and/or an application programming interface (API). TCE 220 may be configured to improve runtime performance when performing computing operations. For example, TCE 220 may include a just-in-time (JIT) compiler, and may be used with a complex instruction set computing (CISC) processor, reduced instruction set computing (RISC) processor, a microprocessor without interlocked pipeline stages (MIPS), a quantum computing device, etc.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block. In some implementations, the model may include model elements that are conditionally executed, such as, for example, enabled subsystems, switch blocks, etc.

In some implementations, a block may include one or more state transition diagrams produced by an environment, such as Stateflow®. Stateflow® may include an environment for modeling and simulating combinatorial and sequential decision logic based on state machines and/or flow charts. Stateflow may permit a user to combine graphical and tabular representations (e.g., state transition diagrams, flow charts, state transition tables, truth tables, etc.) to model how a system reacts to events, time-based conditions, external input signals, etc. With Stateflow the user may design logic for supervisory control, task scheduling, and/or fault management applications. Stateflow may include state machine animation and static and run-time checks for testing design consistency and completeness before implementation. A finite state machine may include a model of a reactive system. The model may define a finite set of states and behaviors and how the system transitions from one state to another state when certain conditions are true. A finite state machine may be used to model complex logic in dynamic systems, such as automatic transmissions, robotic systems, mobile phones, etc. Examples of operations containing complex logic may include: scheduling a sequence of tasks or steps for a system; defining fault detection, isolation, and recovery logic; supervising how to switch between different modes of operation; etc. A finite state machine may be represented by state charts. State charts may provide additional capabilities beyond traditional finite state machines, such as modeling hierarchical states for large-scale systems; adding flow graphs to define complex decision logic; defining orthogonal states to represent systems with parallelism; etc.

A graphical model (e.g., a functional model) may include entities with relationships between the entities, and the relationships and/or the entities may have attributes associated with the relationships and/or the entities. The entities may include model elements, such as blocks and/or ports. The relationships may include model elements, such as lines or signals (e.g., connector lines) and references (e.g., textual labels). The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

In some implementations, a graphical model may have executable semantics and/or may be executable. An executable graphical model may be a time-based block diagram. A time-based block diagram may include, for example, blocks connected by lines (e.g., connector lines). The blocks may include elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time-based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, a non-causal port, an enable port, a trigger port, a function-call port, a publish port, a subscribe port, an exception port, an error port, a physics port, a power port an entity flow port, a data flow port, a control flow port, etc.

In some implementations, TCE 220 may provide a user with an option to perform a coverage analysis of code via a simulation. If the user selects the option, TCE 220 may perform a static analysis of the code to generate static analysis information, and may execute the code. TCE 220 may determine coverage information associated with the executing code, and may compare the static analysis information and the coverage information to determine confidence information associated with the coverage information. TCE 220 may cause client device 210 to display the coverage information and/or the confidence information with the code, and may permit the user to manipulate the coverage information and/or the confidence information.

Server device 230 may include one or more devices capable of receiving, generating, storing, processing, executing, and/or providing information in a manner described herein. For example, server device 230 may include a computing device, such as a server, a desktop computer, a laptop computer, a tablet computer, a handheld computer, or a similar device. In some implementations, server device 230 may host TCE 220 and/or code generator 225.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, a digital signal processor (DSP), and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320. In some implementations, processor 320 may include, for example, an ASIC.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330 and/or storage component 340. A computer-readable medium is defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for selecting an option for displaying coverage information and confidence information associated with code. In some implementations, one or more process blocks of FIG. 4 may be performed by client device 210 (e.g., TCE 220). In some implementations, one or more process blocks of FIG. 4 may be performed by another device or a group of devices separate from or including client device 210, such as server device 230.

As shown in FIG. 4, process 400 may include providing for display options for displaying coverage information for code (block 410). For example, TCE 220 may enable a user to select one or more options for displaying coverage information generated by a coverage analysis performed on code. In some implementations, TCE 220 may cause client device 210 to display an option to test the code via a simulation. In some implementations, the option may include another option to perform a coverage analysis of the code. If the user selects the other option, TCE 220 may cause client device 210 to display images providing examples of coverage information that may be displayed, descriptions of coverage information that may be displayed, images and descriptions of coverage information that may be displayed, etc. For example, the coverage information that may be displayed may include a code coverage indicator, additional information (e.g., whether code is executed during a simulation), confidence information associated with the code coverage, etc.

As further shown in FIG. 4, process 400 may include receiving a selection of a particular option from the options (block 420). For example, a user associated with client device 210 may utilize an input mechanism (e.g., a keyboard, a mouse, etc.) to select one of the options associated with displaying the coverage information. In some implementations, the user may select a particular image that provides an example of particular coverage information desired by the user. In some implementations, the user may select a particular description, or a mechanism (e.g., a checkbox) associated with the particular description, of particular coverage information desired by the user. Client device 210 may receive the selection of the particular option (e.g., the selected coverage option) associated with displaying the determined coverage information.

As further shown in FIG. 4, process 400 may include providing the selection of the particular option to an environment associated with the code (block 430). For example, client device 210 may provide information associated with the selected coverage option to TCE 220, and TCE 220 may receive the information associated with the selected coverage option. For example, TCE 220 may receive information indicating that the user wants to display a code coverage indicator with the code. The code coverage indicator may provide an indication of coverage associated with the code based on the simulation of the code. In some implementations, TCE 220 may receive information indicating that the user wants to display the code coverage indicator and additional coverage information with the code. The additional coverage information may include, for example, an indication of whether a portion of the code is executed during the simulation.

As further shown in FIG. 4, process 400 may include utilizing, via the environment, the particular option to generate coverage information for the code (block 440). For example, TCE 220 may perform a coverage analysis on the code based on the information associated with the selected coverage option. In some implementations, TCE 220 may perform a static analysis of the code to generate static analysis information, and may execute the code. TCE 220 may determine coverage information associated with the executing code, and may compare the static analysis information and the coverage information to determine confidence information associated with the coverage information. After determining the coverage information and the confidence information, TCE 220 may cause client device 210 to generate the selected coverage option based on the coverage information and/or the confidence information. Client device 210 may display the coverage information and/or the confidence information with the code, based on the selected coverage option, and the user may manipulate the coverage information and/or the confidence information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5C:
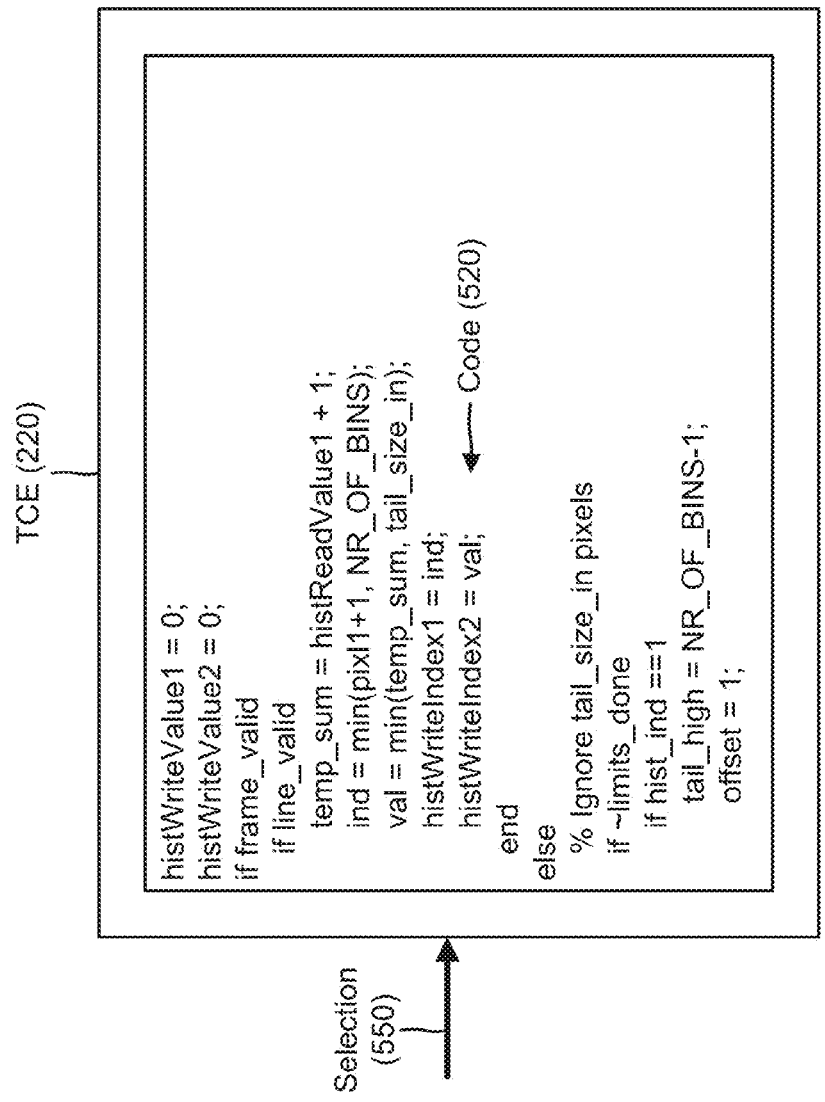

FIGS. 5A-5D are diagrams of an example 500 relating to example process 400 shown in FIG. 4. In example 500, assume that a user utilizes client device 210 to access TCE 220. Further, assume that TCE 220 causes client device 210 to display a user interface 510 associated with TCE 220, as shown in FIG. 5A. User interface 510 may enable the user to perform operations with TCE 220. For example, the user may utilize user interface 510 to define and create code 520, as further shown in FIG. 5A. Assume that the user wishes to execute code 520 based on simulation conditions, and selects a "Run Simulation" button in order to execute code 520. When the user selects the "Run Simulation" button, user interface 510 may display a menu of options for executing code 520, as further shown in FIG. 5A. For example, the menu may include an option to select a test or simulation file (e.g., a simulation file entitled "mlhdlc.dti.tb.m") for execution on code 520, an option to add a test file, an option to log data, and an option 530 to show code coverage.

If the user selects option 530 to show code coverage, TCE 220 may cause client device 210 to display another user interface 540 to the user, as shown in FIG. 5B. User interface 540 may include information instructing the user to select one or more code coverage options. The code coverage options may include a list of different coverage information that may be displayed for code 520. As further shown in FIG. 5B, the list of different coverage information may include descriptions of the different coverage information, selection mechanisms (e.g., checkboxes, radio buttons, etc.) associated with the descriptions, and/or images displaying examples of the different coverage information. The code coverage options may include, for example, an option to display a code coverage indicator; an option to display the code coverage indicator and additional coverage information; an option to display the code coverage indicator, the additional coverage information, and confidence information; and an option to provide user-specified coverage information. In some implementations, the user-specified coverage information may include coverage information specified by the user (e.g., profiling information associated with the code, and/or memory consumption associated with the code, etc.).

In example 500, assume that the user utilizes a selection mechanism (e.g., a mouse cursor) to perform a selection 550 of a radio button associated with the option to display the code coverage indicator, the additional coverage information, and the confidence information. The radio button, when selected, may instruct client device 210 to provide selection 550 to an environment. For example, as shown in FIG. 5C, assume that client device 210 provides selection 550 of the option to TCE 220. Based on selection 550, TCE 220 may simulate how code 520 will execute on target hardware, and may perform a coverage analysis and a confidence analysis of the simulated code 520.

Assume that TCE 220 generates a user interface 560 based on the simulation of code 520 and the performance of the coverage analysis and the confidence analysis. Further, assume that TCE 220 causes client device 210 to provide user interface 560 for display to the user, as shown in FIG. 5D. User interface 560 may include code 520, a coverage indicator 570, additional coverage information 580, and confidence information 590. Coverage indicator 570 may provide an indication of execution coverage associated with portions of code 520. Additional coverage information 580 may include information indicating whether portions of code 520 are executed during the simulation. Confidence information 590 may include information indicating a confidence level (e.g., high, medium, or low) associated with coverage indicator 570 and/or additional coverage information 580. Further details of coverage indicator 570, additional coverage information 580, and confidence information 590 are provided below in connection with, for example, FIGS. 6-7I.

As indicated above, FIGS. 5A-5D are provided merely as an example. Other examples are possible and may differ from what was described with regard to FIGS. 5A-5D. In some implementations, the various operations described in connection with FIGS. 5A-5D may be performed automatically or at the request of the user.

FIG. 6 is a flow chart of an example process 600 for determining coverage information and confidence information associated with code. In some implementations, one or more process blocks of FIG. 6 may be performed by client device 210 (e.g., TCE 220). In some implementations, one or more process blocks of FIG. 6 may be performed by another device or a group of devices separate from or including client device 210, such as server device 230.

As shown in FIG. 6, process 600 may include receiving or retrieving code in an environment (block 610). For example, TCE 220 may receive code from a user associated with client device 210, from an external device, such as server device 230, etc. In some implementations, the user may input the code to client device 210 via TCE 220, via an external memory device (e.g., a CD ROM, a flash drive, etc.), etc. For example, client device 210 may execute a computing environment (e.g., TCE 220) that generates a user interface for inputting code. TCE 220 may cause client device 210 to display the user interface for inputting code to the user. In some implementations, the user may input new code via the user interface. In some implementations, client device 210 may retrieve the code from memory (e.g., memory 330 and/or storage component 340 of FIG. 3) associated with client device 210, and may provide the code to TCE 220. TCE 220 may cause client device 210 to display the code to the user.

In some implementations, the user may utilize TCE 220 to select one or more simulation test benches with which to execute the code. A simulation test bench may include code that permits the user to define a documented, repeatable set of conditions that may be used when executing the code. For example, a simulation test bench may include a file with clock data, input data, error checking procedures, output data, conditional testing procedures, etc. In some implementations, a simulation test bench may correspond to hardware (e.g., a processor, a FPGA, an ASIC, etc.) on which the code may be provided.

As further shown in FIG. 6, process 600 may include performing a static analysis of the code to generate static analysis information (block 620). For example, TCE 220 may perform a static analysis of the code in order to generate static analysis information associated with the code. The static analysis may include an analysis of the code that is performed without actually executing the code. In some implementations, the static analysis may be executed based on the simulation conditions (e.g., the simulation test bench) selected by the user.

In some implementations, the static analysis may include determining properties of some or all possible execution paths, of the code, in some or all possible execution environments. During the static analysis, TCE 220 may keep track of a number of states of the code, where each state may be defined by an execution point in the code and by a set of variable values. In this manner, for a given portion of the code, TCE 220 may keep track of a number of possible execution paths of the code. If the execution path for every possible state were considered, the number of possible execution paths may quickly become computationally infeasible, as the variables in the code can each individually have many different values. In some implementations, TCE 220 may use abstract interpretation to limit the number of execution paths to a computationally manageable set. Abstract interpretation may refer to the approximation of mathematical structures, such as variables in the code, by representing the variable states abstractly. TCE 220 may utilize a number of different abstract interpretation techniques. For example, TCE 220 may utilize abstract domains to approximate variables in the code based on signs of variables, intervals assigned to the variables, specific values assigned to variables (e.g., 0), linear equalities, difference-bound matrices, etc.

In some implementations, during the static analysis, TCE 220 may classify or divide the code into blocks of code based on the structure of the code. For example, TCE 220 may identify conditional statements in the code (e.g., "if" statements, "else" statements, "or" statements, etc.), functions in the code, etc., and may divide the code into blocks based on the identified conditional statements, functions, etc. In one example, if the code included the syntax:

if $x>1$ $x=x+10$;

else $x=x-10$;

end,

TCE 220 may divide the syntax into a first block (e.g., if $x>1$ and $x=x+10$) and a second block (e.g., else and $x=x-10$).

After dividing the code into blocks, TCE 220 may determine a theoretically possible maximum number of times that each block of the code may be executed based on the simulation conditions (e.g., the simulation test bench) selected by the user for the code. For example, if the simulation conditions cause a particular block of the code to be executed one-hundred (100) times, TCE 220 may determine that one-hundred (100) is the maximum number of times that the particular block of the code may be executed. In another example, if the simulation conditions cause the particular block of the code to be executed only once (e.g., when the particular block is initialization code), TCE 220 may determine that one (1) is the maximum number of times that the particular block of the code may be executed. In still another example, assume that the particular block is a conditional block that is executed when a sign of a variable is positive (e.g., rather than negative). Further assume that the sign of the variable is positive fifty (50) times and negative fifty (50) times during the theoretical execution of the code. In such an example, TCE 220 may determine that fifty (50) is the maximum number of times that the particular block of the code may be executed.

In some implementations, TCE 220 may cause client device 210 to store the static analysis information in memory (e.g., memory 330 and/or storage component 340 of FIG. 3), such as, for example, the maximum number of times that each block of the code may be executed.

As further shown in FIG. 6, process 600 may include executing the code in the environment (block 630). For example, TCE 220 may execute one or more portions of the code based on the simulation conditions (e.g., the simulation test bench) selected by the user for the code. In some implementations, TCE 220 may execute the entire code to completion or the one or more portions of the code to completion based on the simulation conditions. In some implementations, if the user selected multiple simulation test benches, TCE 220 may execute one or more portions of the code multiple times based on the simulation conditions associated with each of the simulation test benches selected by the user.

As further shown in FIG. 6, process 600 may include determining coverage information associated with the executing code (block 640). For example, TCE 220 may perform a coverage analysis (e.g., an execution coverage analysis) of the executing code, and may generate coverage information based on the coverage analysis. In some implementations, during the coverage analysis, TCE 220 may utilize the blocks of the code that are identified during the static analysis.

In some implementations, during the coverage analysis, TCE 220 may determine an actual number of times that each block of the code is executed based on the simulation conditions (e.g., the simulation test bench) selected by the user for the code. For example, if a particular block of the code is executed ninety-nine (99) times, TCE 220 may determine that ninety-nine (99) is the actual number of times that the particular block of the code is executed during the simulation. In another example, if the particular block of the code is not executed at all (e.g., indicating a dead zone in the code), TCE 220 may determine that zero (0) is the number of times that the particular block of the code is executed during the simulation.

In some implementations, TCE 220 may cause client device 210 to store the determined coverage information in memory (e.g., memory 330 and/or storage component 340 of FIG. 3). In some implementations, TCE 220 may determine and store other coverage information associated with the executing code, such as, for example, minimum/maximum range coverage, overflow information, profiling information, memory consumption, etc.

As further shown in FIG. 6, process 600 may include comparing the static information and the coverage information to determine confidence information associated with the coverage information (block 650). For example, TCE 220 may compare the static information (e.g., provided by the static analysis) and the coverage information (e.g., provided by the coverage analysis) to determine confidence information associated with the coverage information. In some implementations, TCE 220 may cause client device 210 to store the determined confidence information in memory (e.g., memory 330 and/or storage component 340 of FIG. 3).

In some implementations, for each block of the code identified during the static analysis, TCE 220 may divide the actual number of times that a block is executed (e.g., determined during the coverage analysis) by the maximum number of times that the block may be executed (e.g., determined during the static analysis) in order to determine a confidence measure for the block. In some implementations, the confidence measure for the block may include a fraction (e.g., actual times executed (99)/maximum times may be executed (100)=99/100) or a percentage (e.g., actual times executed (88)/maximum times may be executed (100)=88%). In some implementations, the confidence measures for all the blocks of the code (or a subset of blocks of the code) may be referred to as confidence information.

In some implementations, TCE 220 may utilize the confidence measures for the blocks of the code to determine different confidence levels (e.g., high, medium, and low confidence) for the blocks of the code. In some implementations, if the confidence measure for a block is greater than a particular value (e.g., 60%, 70%, 80%, etc.), TCE 220 may determine a high confidence level for the block. In some implementations, a high confidence level may provide an indication that the block is executing properly. For example, assume that a block of the code includes code that may only be executed once (e.g., code that may be executed at power-up, initialization code, code associated with a triggering event, code that may be executed at power-down, etc.). Thus, TCE 220 may determine, during the static analysis, that the maximum number of times that the block may be executed is one (1). Further, assume that TCE 220 determines, during the coverage analysis, that the actual number of times that the block is executed is one (1). In such an example, TCE 220 may determine a confidence measure of 100% and a high confidence level for the block.

In another example, assume that a block of the code includes conditional code that may only be executed 50% of the time (e.g., code associated with true and false conditions, code associated with positive or negative signs, etc.). Thus, if the simulation requires the block to be reached twenty (20) times, the block may be executed only ten (10) times. Further, assume that TCE 220 determines that the maximum number of times that the block may be executed is ten (10), and that the actual number of times that the block is executed is ten (10). In such an example, TCE 220 may determine a confidence measure of 100% and a high confidence level for the block.

In some implementations, if the confidence measure for a block is greater than a first particular value (e.g., 30%, 40%, 50%, etc.) and less than or equal to a second particular value (e.g., 60%, 70%, 80%, etc.), TCE 220 may determine a medium confidence level for the block. In some implementations, a medium confidence level may provide less of an indication that the block is executing properly than the high confidence level. For example, assume that a block of the code may be executed one-hundred (100) times according to the static analysis. Thus, TCE 220 may determine that the maximum number of times that the block may be executed is one-hundred (100). Further, assume that TCE 220 determines that the actual number of times that the block is executed is fifty-five (55). In such an example, TCE 220 may determine a confidence measure of 55% and a medium confidence level for the block.

In some implementations, if the confidence measure for a block is less than or equal to a particular value (e.g., 30%, 40%, 50%, etc.), TCE 220 may determine a low confidence level for the block. In some implementations, a low confidence level may provide less of an indication that the block is executing properly than the medium and high confidence levels, and/or may indicate a problem with the block. For example, assume that a block of the code may be executed two-hundred (200) times according to the static analysis. Thus, TCE 220 may determine that the maximum number of times that the block may be executed is two-hundred (200). Further, assume that TCE 220 determines that the actual number of times that the block is executed is two (2). In such an example, TCE 220 may determine a confidence measure of 1% and a low confidence level for the block.

As further shown in FIG. 6, process 600 may include providing the coverage information and/or the confidence information for display with the code (block 660). For example, TCE 220 may cause client device 210 to display the coverage information and/or the confidence information with the code. In some implementations, the information displayed, by client device 210, may be based on information received from the user, as described above in connection with FIGS. 4-5D. For example, in some implementations, client device 210 may display, with the code, a coverage indicator that provides an indication of execution coverage associated with each block of the code. In some implementations, the coverage indicator may include a bar with different indicators (e.g., colors, shadings, fill patterns, etc.), where each indicator may be associated with a particular coverage measure. For example, a first indicator (e.g., the color green) may be associated with a coverage measure indicating execution coverage greater than a particular value (e.g., 90%, 95%, etc.); a second indicator (e.g., the color yellow) may be associated with a coverage measure indicating execution coverage less than a first particular value (e.g., 90%, 95%, etc.) and greater than a second particular value (e.g., 50%, 60%, etc.); a third indicator (e.g., the color red) may be associated with a coverage measure indicating execution coverage less than a particular value (e.g., 50%, 60%, etc.); etc.

In some implementations, the colors of the coverage indicator may include different shades of colors depending upon the execution coverage. For example, dark green may be associated with a coverage measure indicating execution coverage in a first range (e.g., >95% and ≤100%), lighter green may be associated with a coverage measure indicating execution coverage in a second range (e.g., >90% and ≤95%), and even lighter green may be associated with a coverage measure indicating execution coverage in a third range (e.g., >85% and ≤90%). In some implementations, one or more indicators of the coverage indicator may include an effect that highlights the indicator, such as, for example, flashing or blinking colors, shading, etc.; animation; etc.

In some implementations, if the user selects or hovers over the coverage indicator, TCE 220 may cause client device 210 to display additional coverage information and/or the confidence information to the user. In some implementations, client device 210 may extend the different indicators (e.g., colors, shadings, fill patterns, etc.) of the coverage indicator to encompass one or more of the blocks of the code. For example, assume that a block of the code is associated with a green colored indicator of the coverage indicator. If the user selects or hovers over the green colored indicator of the coverage indicator, client device 210 may highlight the block of the code in green, and may display the green-highlighted block to the user.

In some implementations, client device 210 may display additional coverage information if the user selects or hovers over the coverage indicator. For example, client device 210 may display information indicating whether each block of the code is executed during the simulation. In some implementations, if TCE 220 determines that a particular block of the code is not executed during the simulation, client device 210 may display information indicating that the particular block is not reached during the simulation. In some implementations, if TCE 220 determines that a particular block of the code is executed once during the simulation, client device 210 may display information indicating that the particular block is executed once during the simulation. In some implementations, if TCE 220 determines that a particular block of the code is executed more than once during the simulation, client device 210 may display information indicating that the particular block is executed during the simulation.

In some implementations, client device 210 may display confidence information if the user selects or hovers over the coverage indicator. For example, client device 210 may display information indicating a confidence level (e.g., high, medium, or low) associated with each block of the code. In some implementations, if TCE 220 determines that a particular block of the code is associated with a confidence measure that is greater than a particular value (e.g., 90%, 95%, etc.), client device 210 may display information indicating a high confidence level for the particular block. In some implementations, if TCE 220 determines that a particular block of the code is associated with a confidence measure that is less than a first particular value (e.g., 90%, 95%, etc.) and greater than a second particular value (e.g., 50%, 60%, etc.), client device 210 may display information indicating a medium confidence level for the particular block. In some implementations, if TCE 220 determines that a particular block of the code is associated with a confidence measure that is less than a particular value (e.g., 50%, 60%, etc.), client device 210 may display information indicating a low confidence level for the particular block.

In some implementations, client device 210 may display additional confidence information if the user selects or hovers over the coverage indicator. For example, client device 210 may display information indicating a confidence measure (e.g., in percentage) associated with each block of the code. In some implementations, if TCE 220 determines that a particular block of the code is associated with a confidence measure that is equal to a particular value (e.g., 90%), client device 210 may display information indicating the particular value for the particular block. In some implementations, TCE 220 may display model coverage associated with a corresponding block in a graphical model. In such implementations, code coverage for a line of code may be displayed along with the model coverage associated with the corresponding block.

In some implementations, client device 210 may display the confidence information as a confidence indicator (e.g., similar to the coverage indicator) that provides an indication of a confidence measure associated with each block of the code. In some implementations, the confidence indicator may include a bar with different indicators (e.g., colors, shadings, fill patterns, etc.), where each indicator may be associated with a particular confidence measure (e.g., high, medium, or low). In some implementations, the colors, shadings, fill patterns, etc. used in connection with the coverage indicator and/or the confidence indicator may be user configurable.

As further shown in FIG. 6, process 600 may include permitting a user to manipulate the coverage information and/or the confidence information (block 670). For example, if the user selects or hovers over the coverage indicator, TCE 220 may cause client device 210 to display the additional coverage information and/or the confidence information to the user, as described above. In some implementations, if the selects or hovers over a particular section of the coverage indicator, TCE 220 may cause client device 210 to display additional coverage information and/or confidence information for a block associated with the particular section. In some implementations, if the user selects or hovers over the coverage indicator a second time, TCE 220 may cause client device 210 to stop displaying the additional coverage information and/or the confidence information to the user.

In some implementations, TCE 220 may provide recommendations with respect to blocks associated with low confidence measures and/or low execution coverage. For example, TCE 220 may provide a recommendation on how to correct the blocks associated with the low confidence measures and/or the low execution coverage. In such an example, TCE 220 may suggest removal of the blocks, changes to parameters associated with the blocks, rearrangement of the blocks, etc.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
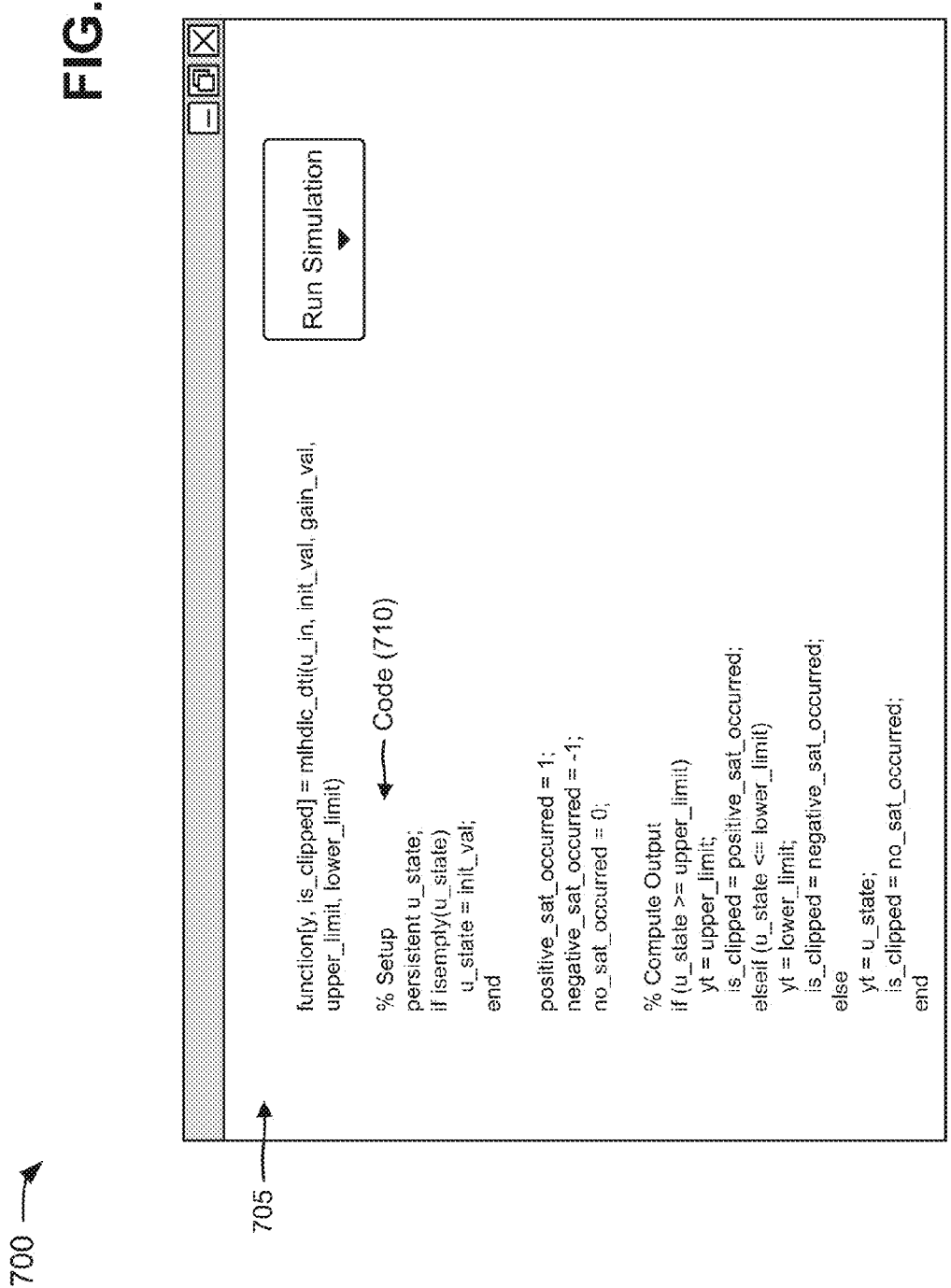

FIGS. 7A-7I are diagrams of an example 700 relating to example process 600 shown in FIG. 6. In example 700, assume that a user utilizes client device 210 to access TCE 220. Further, assume that TCE 220 causes client device 210 to display a user interface 705 associated with TCE 220, as shown in FIG. 7A. User interface 705 may enable the user to perform operations with TCE 220. For example, the user may utilize user interface 705 to define and create code 710 for TCE 220, as further shown in FIG. 7A. In some implementations, TCE 220 may receive or retrieve code 710 from another device (e.g., server device 230) and/or from memory. Assume that the user previously selected a code coverage option, as described above in connection with FIGS. 4-5D, and selected a simulation test bench for code 710. Further, assume that the user utilizes user interface 705 to select the "Run Simulation" button and execute code 710 based on the simulation test bench.

When the user selects the "Run Simulation" button, TCE 220 may perform a static analysis of code 710 based on the selection of the code coverage option by the user. TCE 220 may divide code 710 into blocks 715 based on the structure of code 710, as shown in FIG. 7B. For example, TCE 220 may divide code 710 into five blocks 715 labeled first through fifth. TCE 220 may determine a maximum number of times that each block 715 may be executed based on the simulation test bench, as indicated by reference number 720. For example, as further shown in FIG. 7B, TCE 220 may determine that the first block 715 may be executed a maximum number of times 720 of one-thousand (1,000), the second block 715 may be executed a maximum number of times 720 of one (1), the third block 715 may be executed a maximum number of times 720 of two-thousand (2,000), the fourth block 715 may be executed a maximum number of times 720 of one-thousand (1,000), and the fifth block 715 may be executed a maximum number of times 720 of one-hundred (100). The maximum number of times 720 that blocks 715 may be executed may correspond to the static analysis information for code 710.

TCE 220 may perform a coverage analysis of code 710. For example, as shown in FIG. 7C, TCE 220 may execute code 710 based on the simulation test bench selected by the user to generate executed blocks of code 710, as indicated by reference number 725. TCE 220 may determine an actual number of times that each block 715 is executed (e.g., executed blocks of code 725), as indicated by reference number 730. For example, as further shown in FIG. 7C, TCE 220 may determine that the first block 715 is executed an actual number of times 730 of nine-hundred and ninety (999), the second block 715 is executed an actual number of times 730 of one (1), the third block 715 is executed an actual number of times 730 of one-thousand nine-hundred and ninety (1,999), the fourth block 715 is executed an actual number of times 730 of zero (0), and the fifth block 715 is executed an actual number of times 730 of sixty-three (63). The actual number of times 730 that blocks 715 are executed may correspond to the coverage information for code 710.

TCE 220 may perform a confidence analysis of code 710. For example, TCE 220 may utilize the maximum number of times 720 that each block 715 may be executed and the actual number of times 730 that each block 715 is executed to determine a confidence measure 740 for each block 715, as shown in FIG. 7D. TCE 220 may divide 735 the actual number of times 730 that each block 715 is executed by the maximum number of times 720 that each block 715 may be executed in order to determine confidence measure 740 for each block 715. As further shown in FIG. 7D, based on these calculations, TCE 220 may determine that the first block 715 is associated with a confidence measure 740 of 99%, the second block 715 is associated with a confidence measure 740 of 100%, the third block 715 is associated with a confidence measure 740 of 99%, the fourth block 715 is associated with a confidence measure 740 of 0%, and the fifth block 715 is associated with a confidence measure 740 of 63%.

In some implementations, TCE 220 may utilize confidence measures 740 to determine a confidence level for each block 715 of code 710. For example, based on confidence measures 740, TCE 220 may determine a high confidence level for the first, second, and third blocks 715, may determine a low confidence level for the fourth block 715, and may determine a medium confidence level for the fifth block 715.

Figure 7E:
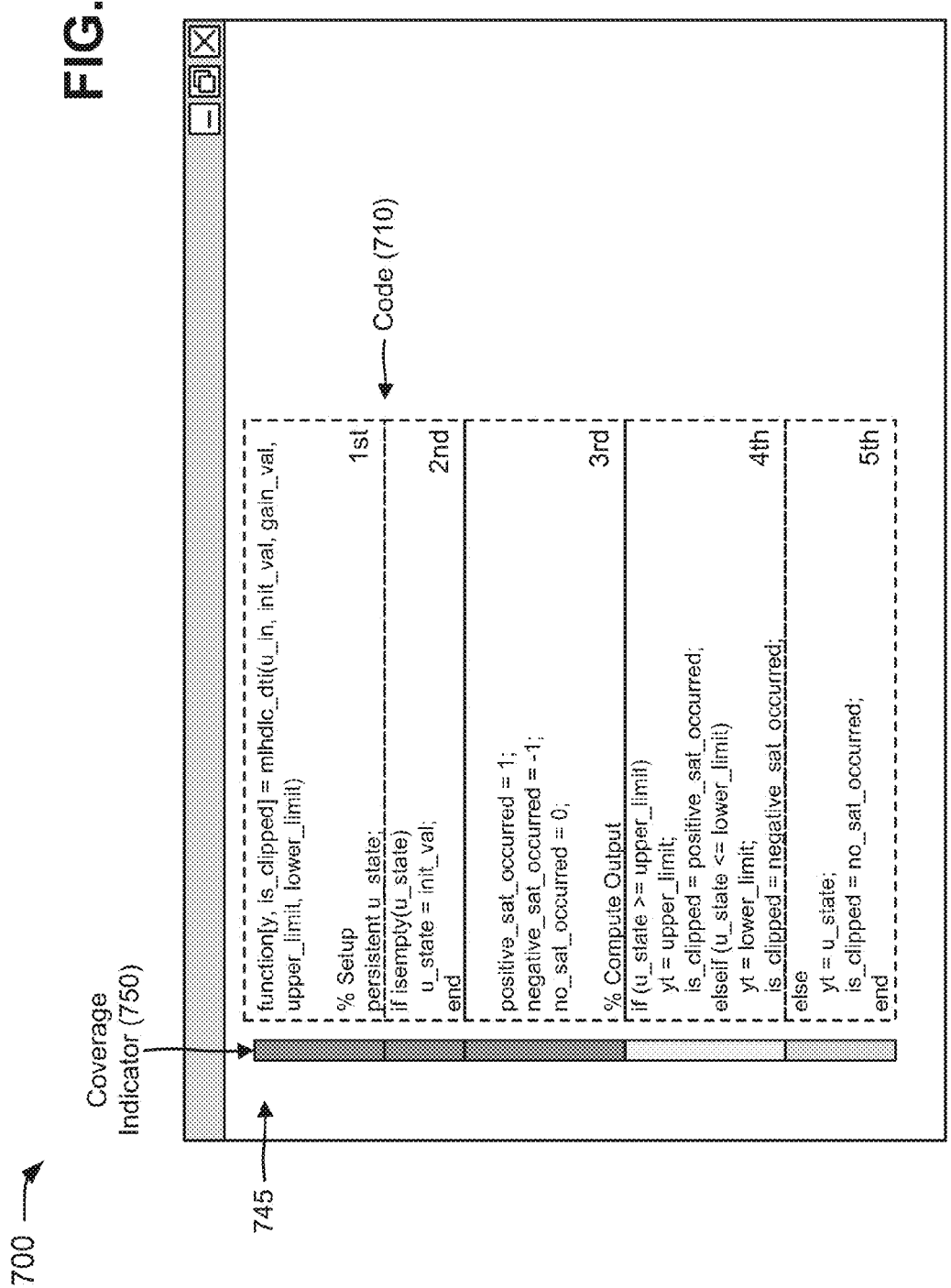

After calculating confidence measures 740 and/or the confidence levels for blocks 715, TCE 220 may cause client device 210 to display a user interface 745, as shown in FIG. 7E. User interface 745 may include code 710 and a coverage indicator 750 that provides an indication of execution coverage associated with each block 715 of code 710. Coverage indicator 750 may include a bar with different colors or shadings, where each color or shade may be associated with a particular execution coverage. For example, a darker shading of coverage indicator 750 may indicate a higher execution coverage and a lighter shading of coverage indicator 750 may indicate a lower execution coverage. Thus, as further shown in FIG. 7E, the first, second, and third blocks 715 of code 710 may include a higher execution coverage than the fourth and fifth blocks 715 of code 710, and the fifth block 715 of code 710 may include a higher execution coverage than the fourth block 715 of code 710.

Assume that the user utilizes a selection mechanism (e.g., a mouse cursor) to select or hover over coverage indicator 750. When the user selects or hovers over coverage indicator 750, TCE 220 may cause client device 210 to display, in user interface 745, colors and/or shadings 755 in blocks 715 of code 710, additional coverage information 760, and confidence information 765, as shown in FIG. 7F. Colors/shadings 755 may extend the colors/shadings, provided by coverage indicator 750, to blocks 715 of code 710. For example, the darkest color/shading may be extended to the first, second, and third blocks 715 of code 710, the next darkest color/ shading may be extended to the fifth block 715 of code 710, and the lightest color/shading may be extended to the fourth block 715 of code 710.

Additional coverage information 760 may include information indicating whether each block 715 is executed during the simulation. For example, as shown in FIG. 7F, additional coverage information 760 may indicate that the first, third, and fifth blocks 715 are executed during the simulation, the second block 715 is executed once during the simulation, and the fourth block 715 is not reached (e.g., executed) during the simulation.

Confidence information 765 may include information indicating confidence levels associated with coverage information (e.g., provided by coverage indicator 750, colors/shadings 755, and/or additional coverage information 760) for each block 715 of code 710. For example, as shown in FIG. 7F, confidence information 765 may indicate a high confidence level for the coverage information associated with the first, second, and third blocks 715 of code 710, a low confidence level for the coverage information associated with the fourth block 715 of code 710, and a medium confidence level for the coverage information associated with the fifth block 715 of code 710.

Figure 7G:
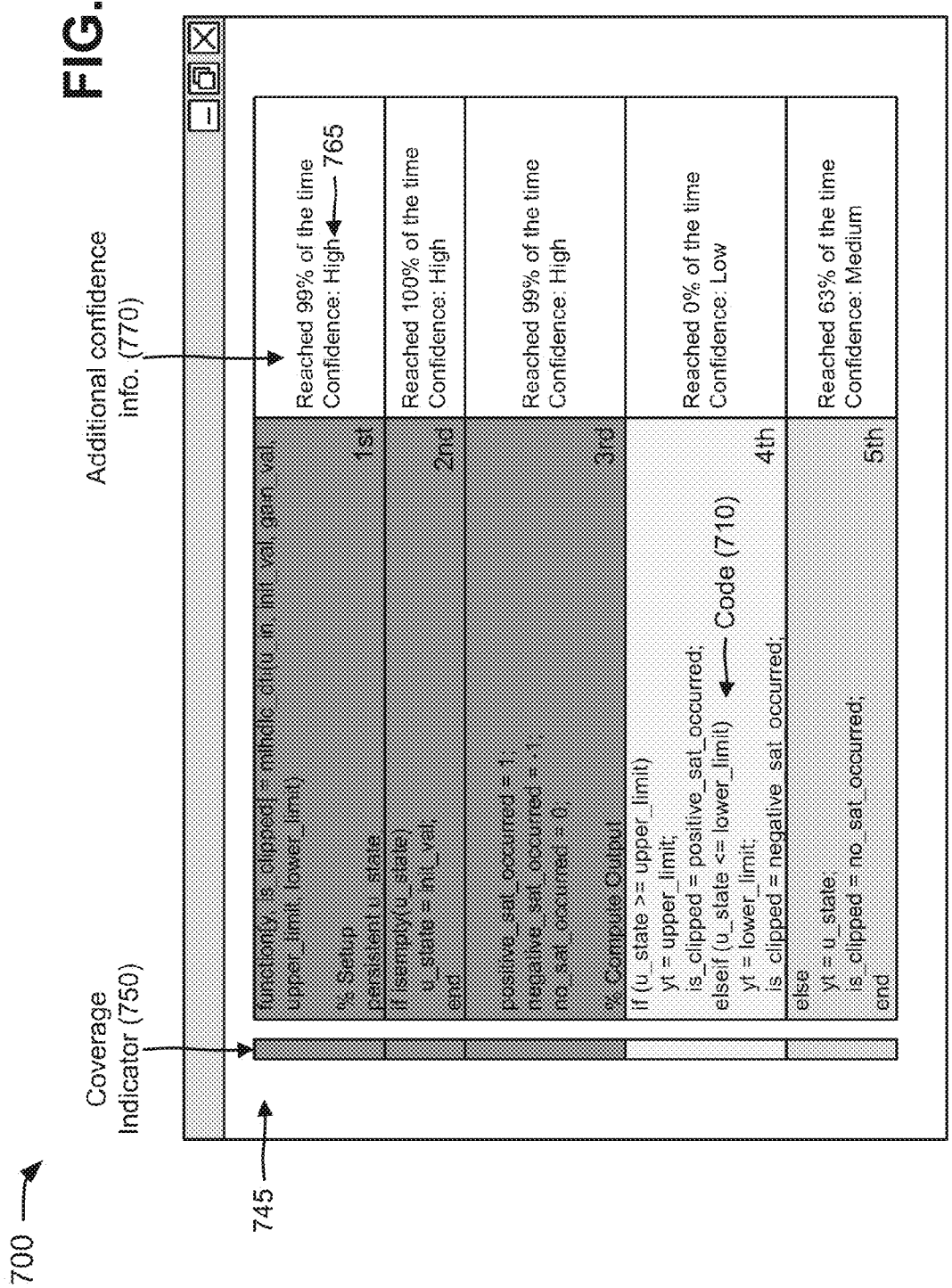

In some implementations, when the user selects or hovers over coverage indicator 750, TCE 220 may cause client device 210 to display, in user interface 745, additional confidence information 770, as shown in FIG. 7G. Additional confidence information 770 may include information indicating confidence measures (e.g., in percentage) associated with the coverage information (e.g., provided by coverage indicator 750, colors/shadings 755, and/or additional coverage information 760) for each block 715 of code 710. For example, as shown in FIG. 7G, additional confidence information 770 may indicate that the first and third blocks 715 of code 710 could be reached (e.g., executed) 99% of the time during the simulation, the second block 715 of code 710 could be reached 100% of the time during the simulation, the fourth block 715 of code 710 could be reached 0% of the time during the simulation, and the fifth block 715 of code 710 could be reached 63% of the time during the simulation. In some implementations, additional confidence information 770 may be displayed with colors/shadings 755, additional coverage information 760, and/or confidence information 765.

Figure 7H:
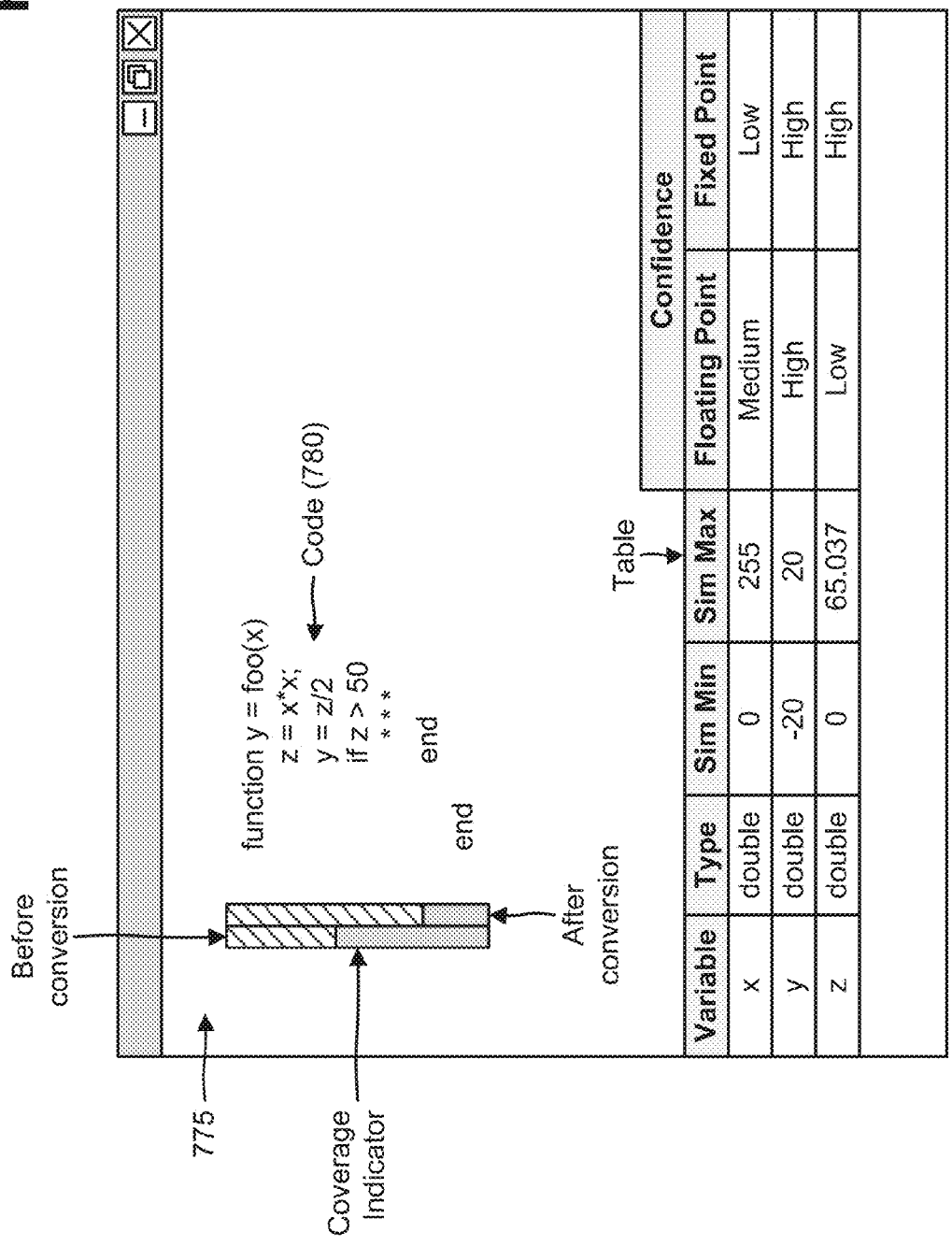

In some implementations, a user may want to execute code using floating-point variables, and then may want to execute the same code after converting the floating-point variables to fixed-point variables. For example, as shown in FIG. 7H, the user may utilize a user interface 775 provided by TCE 220 to create code 780 with floating-point variables. The user may wish to implement code 780 on a particular test bench (e.g., a piece of hardware, such as a FPGA) by converting the floating-point variables of code 780 to fixed-point variables. The user may also wish to verify that the floating-point variables of code 780 are numerically close to the fixed-point variables of code 780 after the conversion.

TCE 220 may perform a static analysis, a coverage analysis, and a confidence analysis of code 780 before and after converting the floating-point variables of code 780 to fixed-point variables. Based on these analyses, TCE 220 may determine coverage information and/or confidence information for code 780 before and after converting the floating-point variables to fixed-point variables. As shown in FIG. 7H, TCE 220 may cause client device 210 to display, in user interface 775, a coverage indicator that provides an indication of the coverage information for code 780 before and after converting the floating-point variables to fixed-point variables. The coverage indicator may include a first bar that provides indicators (e.g., colors, shadings, fill patterns, etc.) associated with coverage for code 780 before converting the floating-point variables to fixed-point variables. The coverage indicator may include a second bar that provides indicators associated with coverage for code 780 after converting the floating-point variables to fixed-point variables. As further shown in FIG. 7H, the coverage indicator may indicate that the coverage for code 780 changes when the floating-point variables are converted to fixed-point variables.

As further shown in FIG. 7H, TCE 220 may cause client device 210 to display, in user interface 775, a table that provides information associated with the variables (e.g., x, y, and z) of code 780. For example, the table may include information associated with a data type of the variables (e.g., a double, an integer, etc.), simulation minimum values for the variables, simulation maximum values for the variables, and confidence levels (e.g., high, medium, or low) for the floating-point and fixed-point variables for blocks and/or lines of code 780 in which the variables are located. As further shown in FIG. 7H, the confidence levels of the table may indicate that the confidence levels for code 780 change when the floating-point variables are converted to fixed-point variables. The user may utilize such information to determine whether code 780 is executing properly both before and after the conversion of the variables.

In some implementations, a confidence measure for variables may be derived from computing ranges via static analysis and comparing the computed ranges with ranges observed via simulation/execution for floating-point variables; computing ranges via static analysis and comparing the computed ranges with ranges observed via simulation/execution for fixed-point variables; comparing ranges observed for a variable location/expression (e.g., a+1) between floating-point and fixed-point variables; and comparing ranges observed for a variable/expression against a numerical range allowed by a fixed-point type chosen for the variable/expression.

In some implementations, a condition may evaluate to true a different number of times in floating-point and fixed-point executions of the code and/or the model. This information may also be displayed in a table that includes theoretical (e.g., statically determined) coverage information, floating-point coverage information, and fixed-point coverage information. In some implementations, condition decision coverage information may include information about all sub-conditions of a condition. For example, for code (e.g., c=c1 && c2), TCE 220 may determine that when c is true, whether c1 is always true, and may determine whether the code changes between floating-point and fixed-point.

In one example, assume that a line of code includes the syntax if (top1<bottom2||top2<bottom1)), and that TCE 220 generates a decisions analyzed table, a conditions analyzed table, and a MC/DC analysis table based on the line of code.

| Decisions Analyzed Table | |
|---|---|
| if(top1 < bottom2 || top2 < bottom1)) | 100% |
| False | 5/11 |
| True | 6/11 |

| Conditions Analyzed Table | | |
|---|---|---|
| Description | True | False |
| top1 < bottom2 | 2 | 9 |
| top2 < bottom1 | 4 | 5 |

| MC/DC Analysis Table | | |
| --- | --- | --- |
| Decision/Condition | True Out | False Out |
| top1 < bottom2 \|\| top2 < bottom1 | | |
| top1 < bottom2 | Tx | FF |
| top2 < bottom1 | FT | FF |

The decisions analyzed table may indicate that there are two possible outcomes for the decision in the line of code (e.g., true and false). Five of the eight times the line of code is executed, the decision may be evaluated to false, and the remaining three times, the decision may be evaluated to true. Because both possible outcomes occurred, the decision coverage may be calculated as 100%.

The conditions analyzed table may provide additional information associated with the decision for the line of code. Because the decision includes two conditions linked by a logical OR (e.g., ||) operation, only one condition may evaluate to true for the decision to be true. If the first condition evaluates to true, there may be no need to evaluate the second condition. Assume that the first condition (e.g., top1<bottom2) is evaluated eight times and evaluates to true twice. This means that the second condition (e.g., top2<bottom1) is evaluated only six times. Further, assume that the second condition is evaluated to true only once, which means that the total true occurrences for the decision is three.

MC/DC coverage may search for decision reversals that occur because one condition outcome changes from true to false or from false to true. The MC/DC analysis table may identify all possible combinations of outcomes for the conditions that lead to a reversal in the decision. A character "x" may be used to indicate a condition outcome that is irrelevant to the decision reversal. Decision-reversing outcomes that are not achieved during simulation may be marked with a set of parentheses. Since the MC/DC analysis table does not include parentheses, all decision-reversing outcomes may have occurred and MC/DC coverage may be complete for the decision in the line of code.

In some implementations, the user may want to execute code 780 on multiple test benches (e.g., different types of hardware, such as a FPGA, an ASIC, etc.) in order to identify target hardware for code 780. The user may specify the multiple test benches for code 780, and may instruct TCE 220 to execute code 780 for the multiple test benches. TCE 220 may perform a static analysis, a coverage analysis, and a confidence analysis of code 780 for each of the multiple test benches based on the user's instruction.

Based on the analyses, TCE 220 may determine coverage information and/or confidence information for code 780 for each of the multiple test benches. As shown in FIG. 7I, TCE 220 may cause client device 210 to display, in a user interface 785, a coverage indicator that provides an indication of the coverage information for code 780 for each of the multiple test benches. The coverage indicator may include a number bars that provide indicators (e.g., colors, shadings, fill patterns, etc.) associated with coverage for code 780 for each of the multiple test benches. As further shown in FIG. 7I, the coverage indicator may indicate that the coverage for code 780 is different for each of the multiple test benches.

As further shown in FIG. 7I, TCE 220 may cause client device 210 to display, in user interface 785, a table that provides information associated with the variables (e.g., x, y, and z) of code 780. For example, the table may include information associated with a data type of the variables (e.g., a double, an integer, etc.), simulation minimum values for the variables, simulation maximum values for the variables, and confidence levels (e.g., high (H), medium (M), or low (L)) for each of the multiple test benches (e.g., Sim1, Sim2, Sim3, and Sim4). As further shown in FIG. 7I, the confidence levels of the table may indicate that the confidence levels for code 780 are different for each of the multiple test benches. The user may utilize such information to determine whether code 780 is executing properly for each of the multiple test benches, and to identify a suitable test bench for code 780.

As indicated above, FIGS. 7A-7I are provided merely as an example. Other examples are possible and may differ from what was described with regard to FIGS. 7A-7I. In some implementations, the various operations described in connection with FIGS. 7A-7I may be performed automatically or at the request of the user.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user of a technical computing environment (TCE) (e.g., via a touch screen display, a mouse, a keyboard, a keypad, voice commands, etc.).

Code may include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising: receiving code for a technical computing environment,
    the receiving the code being performed by a device; receiving conditions for executing the code,
    the receiving the conditions being performed by the device;
    performing a static analysis of the code to generate static analysis information for the code, the static analysis information identifying a maximum number of times that each block of code, of a plurality of blocks of code included in the code, may be executed,
    the performing the static analysis including determining the maximum number of times that each block of code may be executed during execution of a subset of possible execution paths for the code based on approximating variable states of variables in the code, by representing the variable states as abstractly represented variable states,
    and interpreting the abstractly represented variable states for the subset of possible execution paths,
    the performing the static analysis of the code being performed by the device; executing the code in the technical computing environment based on the conditions,
    the executing the code being performed by the device; determining coverage information associated with the executing code,
    the coverage information providing a measure of completeness associated with the executing code, and
    the determining the coverage information being performed by the device; comparing the static analysis information and the coverage information to determine
    confidence information associated with the coverage information, the comparing the static analysis information and the coverage information being performed by the device; and
    outputting or storing the coverage information and the confidence information,
    the outputting or storing the coverage information and the confidence information being performed by the device.

2. The method of claim 1, where the outputting the coverage information and the confidence information comprises:
    providing one of the coverage information or the confidence information for display with the code.

3. The method of claim 1, where the performing the static analysis of the code comprises:
    dividing the code into blocks of code based on a structure of the code, the blocks of code including the plurality of blocks of code.

4. The method of claim 3, where the determining the coverage information associated with the executing code comprises:
    determining an actual number of times that each of the plurality of blocks of code is executed, the determined actual number of times for the plurality of blocks of code corresponding to the coverage information for the code.

5. The method of claim 4, where the comparing the static analysis information and the coverage information comprises:
    comparing the actual number of times that each of the plurality of blocks of code is executed with the maximum number of times that each of the plurality of blocks of code may be executed; and determining a confidence measure for each of the plurality of blocks of code based on the comparing the actual number of times that each of the plurality of blocks of code is executed with the maximum number of times that each of the plurality of blocks of code may be executed, the determined confidence measures for the plurality of blocks of code corresponding to the confidence information.

6. The method of claim 5, where the outputting the coverage information and the confidence information comprises:
    providing the determined actual number of times for display via a coverage indicator, the coverage indicator being displayed with the code, and
    the coverage indicator providing an indication of execution coverage associated with the plurality of blocks of code; and
    providing the determined confidence measures for display with the code,
    the confidence measures providing an indication of confidence associated with the execution coverage of the plurality of blocks of code.

7. The method of claim 1, where the outputting the coverage information and the confidence information comprises:
    providing the coverage information for display as a coverage indicator, the coverage indicator being displayed with the code, and
    the coverage indicator providing an indication of execution coverage associated with the plurality of blocks of code; and
    providing the confidence information for display as confidence levels, the confidence levels being displayed with the code, and
    the confidence levels providing an indication of confidence associated with the execution coverage of the plurality of blocks of code.

8. The method of claim 7, where the coverage indicator includes one or more indicators with different colors, shadings, or fill patterns that represent the execution coverage of the plurality of blocks of code.

9. A device, comprising: one or more processors to:
    receive code for a technical computing environment,
    receive conditions for executing the code and a coverage option associated with the code, perform a static analysis of the code to generate static analysis information for the code, the static analysis information identifying a maximum number of times that each block of code, of a plurality of blocks of code included in the code, may be executed, when performing the static analysis, the one or more processors are to determine the maximum number of times that each block of code may be executed during execution of a subset of possible execution paths for the code based on approximating variable states of variables in the code, by representing the variable states as abstractly represented variable states and interpreting the abstractly represented variable states for the subset of possible execution paths, execute the code in the technical computing environment based on the conditions, determine coverage information associated with the executing code based on the coverage option, the coverage information providing a measure of completeness associated with the executing code, compare the static analysis information and the coverage information to determine confidence information associated with the coverage information, and output the coverage information and the confidence information based on the coverage option.

10. The device of claim 9, where, when outputting the coverage information and the confidence information, the one or more processors are to: provide the coverage information and the confidence information for display with the code.

11. The device of claim 9, where, when performing the static analysis of the code, the one or more processors are to:
divide the code into the plurality of blocks of code based on a structure of the code.

12. The device of claim 11, where, when determining the coverage information associated with the executing code, the one or more processors are to:
determine an actual number of times that each of the plurality of blocks of code is executed, the determined actual number of times for the plurality of blocks of code corresponding to the coverage information for the code.

13. The device of claim 12, where, when comparing the static analysis information and the coverage information, the one or more processors are to:
divide the actual number of times that each of the plurality of blocks of code is executed by the maximum number of times that each of the plurality of blocks of code may be executed; and
determining a confidence measure for each of the plurality of blocks of code based on the dividing the actual number of times that each of the plurality of blocks of code is executed by the maximum number of times that each of the plurality of blocks of code may be executed, the determined confidence measures for the plurality of blocks of code corresponding to the confidence information.

14. The device of claim 13, where, when outputting the coverage information and the confidence information, the one or more processors are to:
provide the determined actual number of times for display via a coverage indicator, the coverage indicator being displayed with the code, and
the coverage indicator providing an indication of execution coverage associated with the plurality of blocks of code, and
provide the determined confidence measures for display with the code,
the confidence measures providing an indication of confidence associated with the execution coverage of the plurality of blocks of code.

15. The device of claim 9, where, when outputting the coverage information and the confidence information, the one or more processors are to:
provide the coverage information for display as a coverage indicator, the coverage indicator being displayed with the code, and
the coverage indicator providing an indication of execution coverage associated with the plurality of blocks of code, and
provide the confidence information for display as confidence levels, the confidence levels being displayed with the code, and the confidence levels providing an indication of confidence associated with the execution coverage of the plurality of blocks of code.

16. A computer-readable medium storing instructions, the instructions comprising:
one or more instructions that, when executed by one or more processors of a device, cause the one or more processors to:
receive code for a technical computing environment, receive conditions for executing the code,
perform a static analysis of the code, based on the conditions, to generate static analysis information for the code, the static analysis information identifying a maximum number of times that each block of code, of a plurality of blocks of code included in the code, may be executed, when performing the static analysis, the one or more instructions cause the one or more processors to determine the maximum number of times that each block of code may be executed during execution of a subset of possible execution paths for the code based on approximating variable states of variables in the code, by representing the variable states as abstractly represented variable states and interpreting the abstractly represented variable states for the subset of possible execution paths abstractly,
execute the code in the technical computing environment based on the conditions, determine coverage information associated with the executing code, the coverage information providing a measure of completeness associated with the executing code, compare the static analysis information and the coverage information to determine confidence information associated with the coverage information, and
output or store the coverage information and the confidence information.

17. The computer-readable medium of claim 16, where the instructions to output or store the coverage information and the confidence information comprise:
one or more instructions that, when executed by the one or more processors, cause the one or more processors to:
provide the coverage information for display as a coverage indicator, the coverage indicator being displayed with the code, and
the coverage indicator providing an indication of execution coverage associated with the plurality of blocks of code, and
provide the confidence information for display as confidence levels, the confidence levels being displayed with the code, and
the confidence levels providing an indication of confidence associated with the execution coverage of the plurality of blocks of code.

18. The computer-readable medium of claim 16, where the instructions to perform the static analysis comprise:
one or more instructions that, when executed by the one or more processors, cause the one or more processors to:
divide the code into blocks of code based on a structure of the code,
the blocks of code including the plurality of blocks of code.

19. The computer-readable medium of claim 18, where the instructions to determine the coverage information associated with the executing code comprise:
one or more instructions that, when executed by the one or more processors, cause the one or more processors to:
determine an actual number of times that each of the plurality of blocks of code is executed, the determined actual number of times for the plurality of blocks of code corresponding to the coverage information for the code.

20. The computer-readable medium of claim 19, where the instructions to compare the static analysis information and the coverage information comprise:
one or more instructions that, when executed by the one or more processors, cause the one or more processors to:
compare the actual number of times that each of the plurality of blocks of code is executed with the maximum number of times that each of the plurality of blocks of code may be executed, and
calculate a confidence measure for each of the plurality of blocks of code based on the comparing the actual number of times that each of the plurality of blocks of code is executed with the maximum number of times that each of the plurality of blocks of code may be executed, the calculated confidence measure for each of the plurality of blocks of code corresponding to the confidence information.

21. The computer-readable medium of claim 16, where the coverage information and the confidence information are based on representations of different data types.

22. The computer-readable medium of claim 16, where the instructions to determine the coverage information associated with the executing code comprise:
one or more instructions that, when executed by the one or more processors, cause the one or more processors to:
determine first coverage information based on floating-point variables included in the code;
covert the floating-point variables to fixed-point variables;
determine second coverage information based on the fixed-point variables; where the instructions to compare the static analysis information and the coverage information to determine the confidence information comprise:
one or more instructions that, when executed by the one or more processors, cause the one or more processors to:
compare the static analysis information and the first coverage information to determine first confidence information associated with the floating-point variables; and
compare the static analysis information and the second coverage information to determine second confidence information associated with the fixed-point variables.

* * * * *